(12) United States Patent
Park et al.

(10) Patent No.: US 9,305,764 B2
(45) Date of Patent: Apr. 5, 2016

(54) PLASMA LIGHT SOURCE, INSPECTION APPARATUS INCLUDING PLASMA LIGHT SOURCE, AND METHOD OF GENERATING PLASMA LIGHT

(71) Applicants: Young-kyu Park, Incheon (KR);
Wook-rae Kim, Suwon-si (KR);
Kwang-soo Kim, Pyeongtaek-si (KR);
Tae-joong Kim, Hwaseong-si (KR);
Byeong-hwan Jeon, Yongin-si (KR)

(72) Inventors: Young-kyu Park, Incheon (KR);
Wook-rae Kim, Suwon-si (KR);
Kwang-soo Kim, Pyeongtaek-si (KR);
Tae-joong Kim, Hwaseong-si (KR);
Byeong-hwan Jeon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/613,988

(22) Filed: Feb. 4, 2015

(65) Prior Publication Data
US 2016/0005588 A1 Jan. 7, 2016

(30) Foreign Application Priority Data
Jul. 1, 2014 (KR) .................. 10-2014-0081983

(51) Int. Cl.
*H01J 61/28* (2006.01)
*H01J 65/04* (2006.01)
*G02B 27/14* (2006.01)

(52) U.S. Cl.
CPC ............. *H01J 65/044* (2013.01); *G02B 27/141* (2013.01)

(58) Field of Classification Search
CPC ....... H01J 65/044; G02B 27/141; G02F 1/157

USPC ............................................ 313/231.31, 114
See application file for complete search history.

(56) References Cited

U.S. PATENT DOCUMENTS

| | | | |
|---|---|---|---|
| 4,890,294 A | 12/1989 | Nishimae et al. | |
| 5,845,480 A | 12/1998 | DeFreitas et al. | |
| 6,333,509 B1 | 12/2001 | Lumpp | |
| 6,377,436 B1 | 4/2002 | Margolin | |
| 6,954,077 B2 | 10/2005 | Strang | |
| 7,214,289 B2 | 5/2007 | Strang et al. | |
| 7,368,741 B2 | 5/2008 | Melnychuk et al. | |
| 7,439,530 B2 | 10/2008 | Ershov et al. | |
| 7,491,954 B2 | 2/2009 | Bykanov et al. | |
| 7,544,269 B2 | 6/2009 | Strang | |
| 7,560,869 B2 | 7/2009 | Miles et al. | |
| 7,705,333 B2 | 4/2010 | Komori et al. | |
| 7,732,227 B2 | 6/2010 | Strang et al. | |
| 7,786,455 B2 | 8/2010 | Smith | |
| 8,022,627 B2 | 9/2011 | Stockwald | |

(Continued)

FOREIGN PATENT DOCUMENTS

| | | |
|---|---|---|
| JP | 2005507075 | 3/2005 |
| JP | 2007317598 | 12/2007 |

(Continued)

*Primary Examiner* — Vip Patel
(74) *Attorney, Agent, or Firm* — Myers Bigel & Sibley, PA

(57) ABSTRACT

A plasma light source includes a chamber having an ionizable medium therein, an ignition source configured to provide first electromagnetic radiation to the chamber, a sustaining source configured to separately provide second electromagnetic radiation to the chamber, a first curved mirror positioned adjacent the chamber, and a second curved mirror positioned opposite the first mirror and arranged to direct the first electromagnetic radiation toward the chamber. The second electromagnetic radiation may be different than the first electromagnetic radiation. Related devices and methods of operation are also discussed.

18 Claims, 25 Drawing Sheets

(56) References Cited

U.S. PATENT DOCUMENTS

| | | |
|---|---|---|
| 8,309,943 B2 | 11/2012 | Smith et al. |
| 8,368,039 B2 | 2/2013 | Govindaraju et al. |
| 8,378,582 B2 | 2/2013 | Kim et al. |
| 8,436,328 B2 | 5/2013 | Yanagida et al. |
| 8,461,761 B2 | 6/2013 | Neate |
| 8,558,202 B2 | 10/2013 | Yanagida et al. |
| 8,614,543 B2 | 12/2013 | Neate |
| 2010/0156295 A1 | 6/2010 | Park et al. |
| 2010/0206483 A1 | 8/2010 | Sorensen et al. |
| 2012/0119648 A1 | 5/2012 | Neate |
| 2013/0052904 A1 | 2/2013 | Pothoven et al. |

FOREIGN PATENT DOCUMENTS

| | | |
|---|---|---|
| JP | 2011082473 | 4/2011 |
| KR | 20130022404 | 3/2013 |
| WO | WO 03/036224 | 5/2003 |

PLASMA LIGHT SOURCE, INSPECTION APPARATUS INCLUDING PLASMA LIGHT SOURCE, AND METHOD OF GENERATING PLASMA LIGHT

CROSS-REFERENCE TO RELATED APPLICATION

This application claims the benefit of Korean Patent Application No. 10-2014-0081983, filed on Jul. 1, 2014, in the Korean Intellectual Property Office, the disclosure of which is incorporated herein in its entirety by reference.

BACKGROUND

The inventive concepts relate to light sources, and more particularly, to laser-induced plasma light sources for use in an exposure process or an inspection process.

Light sources, which can be used in exposure apparatuses and/or optical analysis apparatuses, may be required to provide luminous intensity of a desired wavelength band and have a long life. One such light source is a laser-driven or laser-induced plasma light source. The laser-induced plasma light source may generate plasma by exciting gas filled within a quartz valve using an external laser beam focused thereon. The laser-induced plasma light source may thereby generate light with a stable spectral distribution and/or luminous intensity according to a component composition of the filled gas. However, there may be demand for light sources with higher brightness. In order to implement such high-brightness light sources, it may be necessary to increase the amount of light output by a plasma light source.

SUMMARY

Embodiments of the inventive concepts provide a plasma light source, which more easily ignites plasma and is capable of increasing or maximizing plasma intensity and providing high brightness by effectively focusing plasma light.

Embodiments of the inventive concepts also provide an inspection apparatus including the plasma light source and methods of generating plasma light by using the plasma light source.

According to some embodiments of the inventive concepts, a plasma light source includes a chamber having an ionizable medium therein, an ignition source configured to provide first electromagnetic radiation to the chamber, a sustaining source configured to separately provide second electromagnetic radiation to the chamber, a first curved mirror positioned adjacent the chamber, and a second curved mirror positioned opposite the first mirror and arranged to direct the first electromagnetic radiation toward the chamber. The second electromagnetic radiation may be different than the first electromagnetic radiation. For example, the first electromagnetic radiation may be microwave energy, and the second electromagnetic radiation may be laser energy.

In some embodiments, the ignition source may be a microwave generator configured to provide microwave energy as the first electromagnetic radiation to ignite the plasma, and the sustaining source may be a laser generator configured to provide laser energy as the second electromagnetic radiation to sustain the plasma.

In some embodiments, at least one of the first and second curved mirrors may be a hybrid mirror including first and second layers having different refractive indices. At least one of the first and second layers may be reflective with respect to the first electromagnetic radiation.

In some embodiments, the first and second layers may be inner and outer surfaces, respectively, of different materials and/or different curvatures. For example, the second layer may be reflective to the first electromagnetic radiation, and the first layer may be reflective to light emitted from plasma ignited by the first electromagnetic radiation.

In some embodiments, a focus of the second layer of the second curved mirror may be on the second layer of the first curved mirror.

In some embodiments, a focus of the first layer of the second curved mirror may not be on the chamber.

In some embodiments, a focus of the second layer of the respective first and second curved mirrors may be on the chamber.

In some embodiments, the plasma light source may further include at least one dichroic mirror, which may be reflective with respect to the second electromagnetic radiation. The at least one dichroic mirror may be positioned between the first and second curved mirrors and arranged to direct the second electromagnetic radiation to the first curved mirror.

In some embodiments, the at least one dichroic mirror may be transmissive with respect to the first electromagnetic radiation.

In some embodiments, the at least one dichroic mirror may be a first dichroic mirror. A second dichroic mirror that is reflective with respect to the second electromagnetic radiation may be arranged to direct the second electromagnetic radiation to the first dichroic mirror.

In some embodiments, the second curved mirror may include primary and secondary mirrors. A distance between the primary and secondary mirrors may define a resonator based on a wavelength of the first electromagnetic radiation.

In some embodiments, an outer surface of the first curved mirror may be free of a metal coating.

In some embodiments, the ignition source may be a microwave generator configured to provide microwave energy as the first electromagnetic radiation. A waveguide may be coupled to the microwave generator and configured to transmit the microwave energy from the microwave generator to the first curved mirror. The first curved mirror may be reflective with respect to the microwave energy.

In some embodiments, the waveguide may be positioned at a non-zero angle relative to an axis of symmetry of the first curved mirror.

In some embodiments, the sustaining source may be a laser generator configured to provide laser energy as the second electromagnetic radiation. The second curved mirror may include a pin-hole aperture therein that may be arranged to provide the laser energy from the sustaining source therethrough to the chamber.

In some embodiments, a dimension of the pin-hole aperture may be less than about one half of a wavelength of the microwave energy.

In some embodiments, the plasma light source may further include a dichroic mirror that is reflective or transmissive to the laser energy. The dichroic mirror may be positioned adjacent the pin-hole aperture and may be arranged to direct the laser energy therethrough to the chamber.

In some embodiments, the dichroic mirror may further be reflective or transmissive with respect to light emitted from plasma ignited by the microwave energy, and may be arranged to direct the light emitted from the plasma as an output of the plasma light source.

According to further embodiments of the inventive concepts, a plasma light source includes a chamber having an ionizable medium therein, an ignition source configured to provide first electromagnetic radiation to the chamber, a sustaining source configured to separately provide second electromagnetic radiation to the chamber, and at least one curved mirror positioned adjacent the chamber. For example, the at least one curved mirror may be positioned such that the chamber is between the ignition source and the mirror. The at least one curved mirror includes first and second layers having different refractive indices, at least one of which is reflective to the first electromagnetic radiation.

In some embodiments, the first and second layers of the at least one curved mirror may be inner and outer surfaces, respectively, of different materials and/or different curvatures.

In some embodiments, the at least one curved mirror may include a first hybrid mirror and a second hybrid mirror. The first hybrid mirror may be positioned adjacent the chamber and arranged to direct light emitted from plasma ignited by the first electromagnetic radiation as an output of the light source. The second curved hybrid mirror may be positioned on an opposite side of the chamber relative to the first hybrid mirror and arranged to direct the first electromagnetic radiation toward the first hybrid mirror.

In some embodiments, the outer surfaces of the first and second hybrid mirrors may be reflective to the first electromagnetic radiation. A focus of the outer surface of the second hybrid mirror may be on the outer surface of the first hybrid mirror.

In some embodiments, the inner surfaces of the first and second hybrid mirrors may be reflective to the light emitted from the plasma, and a focus of the inner surface of the second hybrid mirror may not be on the chamber.

In some embodiments, the outer surfaces of the first and second hybrid mirrors may include metal coatings.

In some embodiments, a distance between and/or curvature of the outer surfaces of the first and second hybrid mirrors may define a resonator based on a wavelength of the first electromagnetic radiation.

In some embodiments, the ignition source may be a microwave generator configured to provide microwave energy as the first electromagnetic radiation to the chamber having an initial pressure therein. The sustaining source may be a laser generator configured to provide laser energy as the second electromagnetic radiation and increase a power of the laser energy to increase an intensity of the light emitted from plasma ignited by the microwave energy while the chamber is maintained at the initial pressure.

In some embodiments, the chamber may be positioned between the at least one curved mirror and the microwave generator.

In some embodiments, the laser generator may be configured to provide a continuous wave laser to the chamber at a same time or after ignition of plasma by the microwave generator.

In some embodiments, a lens system may be positioned to receive and direct the light emitted from the plasma after reflection thereof by the at least one hybrid mirror as an output of the plasma light source.

According to still further embodiments of the inventive concepts, a semiconductor inspection apparatus includes a plasma light source. The plasma light source includes a chamber having an ionizable medium therein, an ignition source configured to provide first electromagnetic radiation to the chamber, a sustaining source configured to separately provide second electromagnetic radiation to the chamber, a first curved mirror, and a second curved mirror positioned opposite the first mirror and arranged to direct the first electromagnetic radiation toward the chamber. The semiconductor inspection apparatus further includes an inspection stage configured to support a semiconductor object for inspection, a detector positioned to receive light from the semiconductor object, a first optical system positioned to direct the light output from the plasma light source to the semiconductor object, and a second optical system positioned to direct the light output from the semiconductor object to the detector.

In some embodiments, the inspection apparatus may further include a beam splitter configured to reflect or transmit the light output from the plasma light source to the inspection object and transmit or reflect light from the semiconductor object.

According to yet further embodiments of the inventive concepts, in a method of operating a plasma light source first electromagnetic radiation is provided to a chamber having an ionizable medium therein to ignite plasma such that light is emitted therefrom. Second electromagnetic radiation is separately provided to the chamber to sustain the plasma, where the second electromagnetic radiation is different than the first electromagnetic radiation. For example, the first electromagnetic radiation may be microwave energy, and the second electromagnetic radiation may be laser energy.

In some embodiments, the microwave energy may be provided to the chamber having an initial pressure therein. A power of the laser energy may be increased to increase an intensity of the light emitted from the plasma while the chamber is maintained at the initial pressure.

In some embodiments, a continuous wave laser may be separately provided to the chamber at a same time or after ignition of the plasma.

In some embodiments, at least one hybrid mirror may be arranged adjacent the chamber to direct the light emitted from the plasma as an output of the light source. The least one hybrid mirror may include first and second layers having different refractive indices, at least one of which may be reflective with respect to the light emitted from the plasma.

According to an aspect of the inventive concepts, there is provided a plasma light source including: a chamber that accommodates a medium material for plasma ignition, ignites plasma by using an ignition source, and maintains the plasma by inputting a laser; and a double hybrid mirror that reflects the laser and plasma light output from the chamber, wherein the double hybrid mirror includes: a first hybrid curved mirror, an inner surface and an outer surface of which are different coatings; and a hybrid mirror, of which an inner surface and an outer surface are different coatings, and the first hybrid curved mirror is disposed to face the hybrid mirror.

The ignition source may be a microwave that is input from outside the double hybrid mirror. The hybrid mirror may be a second hybrid curved mirror. The first hybrid curved mirror may surround the chamber and may be opened in a first direction. The inner surface of the first hybrid curved mirror may be an optical coating and have a first curvature, and the outer surface of the first hybrid curved mirror may be a metal coating and have a second curvature. The second hybrid curved mirror may be opened in a direction opposite to the first direction and may be convex in the first direction, and the inner surface of the second hybrid curved mirror may be an optical coating and have a third curvature. The outer surface of the second hybrid curved mirror may be a metal coating and have a fourth curvature.

The metal coatings of the first and second hybrid curved mirrors may reflect the microwave. The optical coatings of the first and second hybrid curved mirrors may transmit the microwave. The optical coating of the first hybrid curved mirror may reflect the laser and the plasma light. The optical coating of the second hybrid curved mirror may reflect the plasma light.

The metal coatings of the first and second hybrid curved mirrors may constitute a resonator for the microwave.

The metal coating of the first hybrid curved mirror may form an oval mirror, and the metal coating of the second hybrid curved mirror may form a spherical mirror.

A focus of the spherical mirror may be a center of the first hybrid curved mirror, and a planar mirror may be formed at the center of the first hybrid curved mirror.

A focus of the spherical mirror may be same as a focus of the oval mirror, and the chamber may be disposed at the focus of the spherical mirror and the oval mirror.

The optical coating of the first hybrid curved mirror may form an oval mirror with a focus at a position at which the chamber is located, and the optical coating of the second hybrid curved mirror may form a spherical mirror with a focus at a position at which the efficiency of output of the plasma light is maximized.

The plasma light source may further include: a first dichroic mirror that is disposed between the first hybrid curved mirror and the second hybrid curved mirror to reflect or transmit light according to a wavelength of the light, wherein the laser is input to the chamber through the first dichroic mirror, and the plasma light is output to the outside of the double hybrid mirror through the first dichroic mirror.

The plasma light source may further include: a second dichroic mirror that is provided at the outside of the double hybrid mirror to input the laser to the first dichroic mirror by reflection and transmit the plasma light from the first dichroic mirror to the outside.

A pin-hole may be formed in the second hybrid curved mirror to input the laser, and a diameter of the pin-hole may be less than a half wavelength of the microwave.

The plasma light source may further include: a dichroic mirror that is provided between the first hybrid curved mirror and the second hybrid curved mirror, wherein the laser passes through the dichroic mirror and is input to the chamber, and the plasma light is reflected by the dichroic mirror and is output to the outside.

The plasma light source may further include: a dichroic mirror that is provided near the pin-hole at the outside of the double hybrid mirror, wherein the laser is transmitted or reflected by the dichroic mirror and is input to the chamber, and the plasma light is transmitted or reflected by the dichroic mirror and is output to the outside.

The hybrid mirror may be a hybrid planar mirror of which the inner surface and the outer surface are planar. The first hybrid curved mirror may surround the chamber and may be opened in a first direction. The inner surface of the first hybrid curved mirror may be an optical coating and have a first curvature. The outer surface of the first hybrid curved mirror may be a metal coating and have a second curvature. The inner surface of the hybrid planar mirror may be an optical coating facing the first hybrid curved mirror, and the outer surface of the hybrid planar mirror may be a metal coating.

The plasma light source may further include: a first dichroic mirror that is disposed between the first hybrid curved mirror and the hybrid planar mirror, and a second dichroic mirror that is disposed at the outside of the double hybrid mirror.

A pin-hole may be formed in the hybrid planar mirror to input the laser, and the plasma light source may further include a dichroic mirror that is disposed between the first hybrid curved mirror and the hybrid planar mirror or is displayed near the pin-hole at the outside of the double hybrid mirror.

The ignition source may be one selected from ultraviolet rays, a capacitive discharge, an inductive discharge, a high frequency wave, a radio frequency wave, a flash lamp, a pulse laser, and a pulse lamp.

According to another aspect of the inventive concepts, there is provided a plasma light source including: a chamber that accommodates a medium material for plasma ignition, ignites plasma by inputting an electromagnetic wave for ignition, and maintains the plasma by inputting a laser; and a double hybrid mirror including a first hybrid curved mirror and a second hybrid curved mirror that are disposed to face each other, wherein an inner surface of the first hybrid curved mirror reflects the laser and plasma light output from the chamber, an inner surface of the second hybrid curved mirror reflects the plasma light, and outer surfaces of the first and second hybrid curved mirrors reflect the electromagnetic wave for ignition.

The electromagnetic wave for ignition may be a microwave. The inner surface of the first hybrid curved mirror may be an optical coating, and the outer surface of the first hybrid curved mirror may be a metal coating. The inner surface of the second hybrid curved mirror may be an optical coating, and the outer surface of the second hybrid curved mirror may be a metal coating.

A pin-hole may be formed in the first hybrid curved mirror, and the laser may be input to the chamber through the pin-hole.

According to another aspect of the inventive concepts, there is provided an inspection apparatus including: a plasma light source including a chamber that ignites plasma by using an ignition source and maintains the plasma by using a laser, and a double hybrid mirror that reflects the laser and plasma light output from the chamber; a movable inspection stage on which an inspection object is placed; a beam splitter that reflects light from the plasma light source and transmits light from the inspection object; a first optical system that transfers the light from the plasma light source to the beam splitter; a second optical system that transfers light reflected from the beam splitter to the inspection object, and transfers light reflected from the inspection object to the beam splitter; and a detector that accommodates light that is transferred after passing through the beam splitter.

The double hybrid mirror may include first and second hybrid curved mirrors, of which inner surfaces and outer surfaces have different curvatures and different coatings, or the double hybrid mirror may include a hybrid curved mirror, of which an inner surface and an outer surface have different curvatures and coatings, and a hybrid planar mirror, of which an inner surface and an outer surface are planar and have different coatings.

The ignition source may be a microwave that is input from the outside of the double hybrid mirror. The double hybrid mirror may include first and second hybrid curved mirrors. The first hybrid curved mirror surrounds the chamber and is opened in a first direction. The inner surface of the first hybrid curved mirror may be an optical coating, and the outer surface of the first hybrid curved mirror may be a metal coating. The second hybrid curved mirror may be opened in a direction opposite to the first direction and may be convex in the first direction. The inner surface of the second hybrid curved mirror may be an optical coating, and the outer surface of the second hybrid curved mirror may be a metal coating. The metal coatings of the first and second hybrid curved mirrors may reflect the microwave, and the optical coatings of the first and second hybrid curved mirrors may transmit the microwave. The optical coating of the first hybrid curved mirror may reflect the laser and the plasma light, and the optical coating of the second hybrid curved mirror may reflect the plasma light.

The inspection apparatus may further include: at least one dichroic mirror that reflects or transmits light according to a wavelength of the plasma light, wherein the laser is input to the chamber through the at least one dichroic mirror and the plasma light is output to the outside through the at least one dichroic mirror.

A pin-hole may be formed in the second hybrid curved mirror or the hybrid planar mirror, and the laser may be input to the chamber through the pin-hole.

According to another aspect of the inventive concepts, there is provided a method of generating plasma light, including: igniting plasma by inputting a microwave to a chamber by using a double hybrid mirror, wherein the chamber accommodates a medium material for plasma ignition; maintaining the plasma by inputting a laser to the chamber; and outputting plasma light from the chamber to the outside by using the double hybrid mirror.

The double hybrid mirror may include: a hybrid curved mirror, of which an inner surface and an outer surface have different curvatures, the inner surface of the hybrid curved mirror being an optical coating, the outer surface of the hybrid curved mirror being a metal coating; and a hybrid planar mirror, of which an inner surface and an outer surface are planar, the inner surface of the hybrid planar mirror being an optical coating, the outer surface of the hybrid planar mirror being a metal coating.

The double hybrid mirror may include first and second hybrid curved mirrors, of which inner surfaces and outer surfaces have different curvatures. The inner surfaces of the first and second hybrid curved mirrors may be optical coatings, and the outer surfaces of the first and second hybrid curved mirrors may be metal coatings. The metal coatings of the first and second hybrid curved mirrors may reflect the microwave. The optical coating of the first hybrid curved mirror may transmit the microwave and reflect the laser and the plasma light. The optical coating of the second hybrid curved mirror may transmit the microwave and reflect the plasma light.

A dichroic mirror may be provided between the first hybrid curved mirror and the second hybrid curved mirror. The laser may be input to the chamber through the dichroic mirror. The plasma light may be output to the outside through the dichroic mirror.

A pin-hole may be formed in the second hybrid curved mirror, and the laser may be input to the chamber through the pin-hole.

Other devices and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

BRIEF DESCRIPTION OF THE DRAWINGS

Exemplary embodiments of the inventive concepts will be more clearly understood from the following detailed description taken in conjunction with the accompanying drawings in which.

DETAILED DESCRIPTION OF THE EMBODIMENTS

Figure 1:
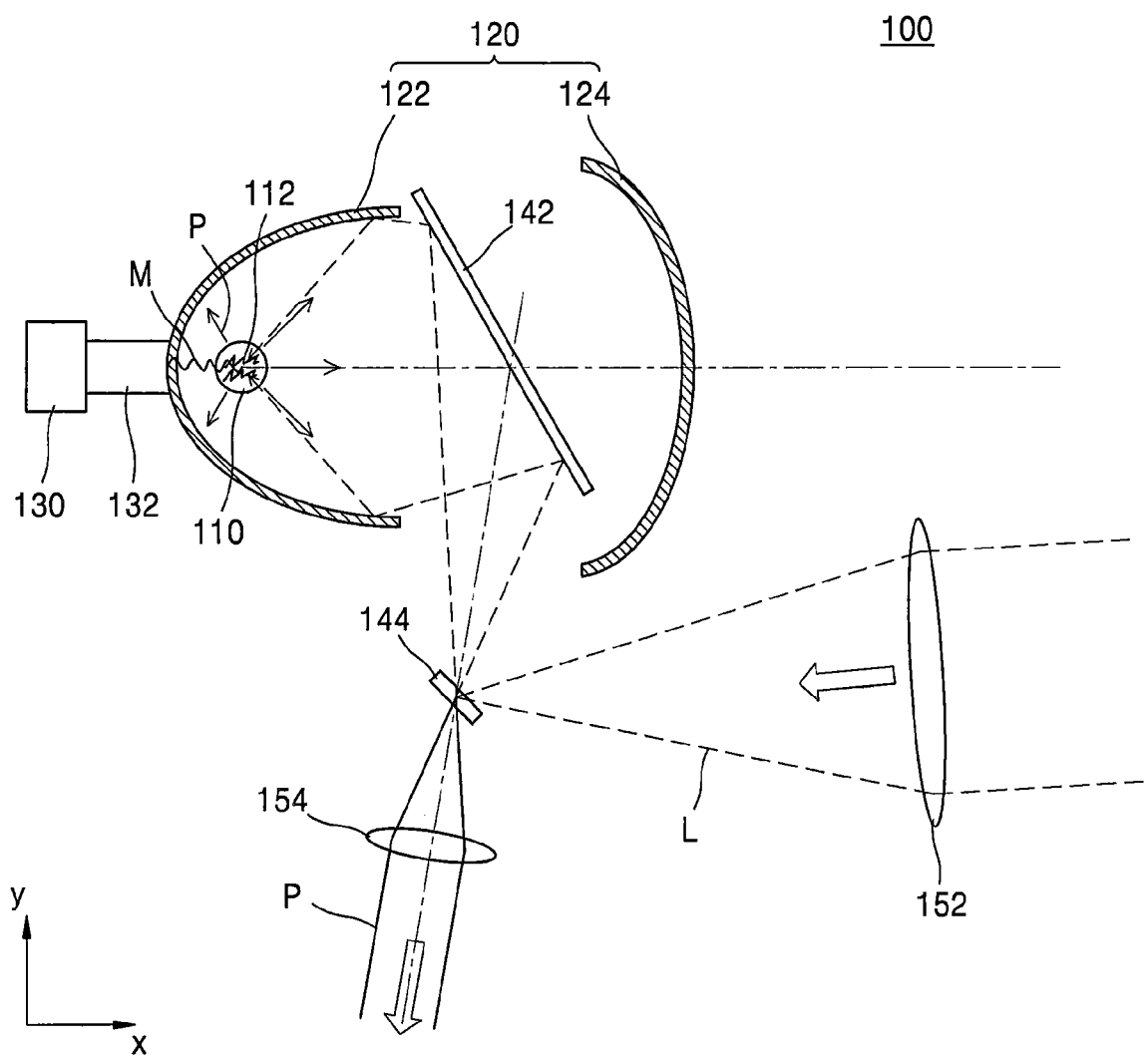
FIG. 1 is a schematic configuration diagram of a plasma light source according to some embodiments of the inventive concepts.

Hereinafter, embodiments of the inventive concepts will be described with reference to the accompanying drawings. The inventive concepts may, however, be embodied in many different forms and should not be construed as being limited to the embodiments set forth herein; rather, these embodiments are provided so that this disclosure will be thorough and complete, and will fully convey the inventive concepts to those of ordinary skill in the art. As used herein, the term "and/or" includes any and all combinations of one or more of the associated listed items. Expressions such as "at least one of," when preceding a list of elements, modify the entire list of elements and do not modify the individual elements of the list.

It will be understood that when an element, such as a layer, a region, or a substrate, is referred to as being "on" or "connected to" or "coupled to" another element, it may be directly on, connected or coupled to the other element or intervening elements may be present. In the drawings, the dimensions of structures are exaggerated for clarity of the inventive concepts. Parts having no relation to the description are omitted. Like reference numerals denote like elements throughout the specification and drawings. The terminology used herein is for the purpose of describing particular embodiments only and is not intended to be limiting of the inventive concepts.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing.

FIG. 1 is a schematic configuration diagram of a plasma light source 100 according to some embodiments of the inventive concepts.

Referring to FIG. 1, the plasma light source 100 according to the present embodiment may include a chamber 110, a double hybrid mirror 120, a microwave generator 130, and a laser generator (160 in FIGS. 13 to 18).

The chamber 110 or a lamp may accommodate a medium material for plasma ignition or excitation, also referred to herein as a plasma source. The chamber 110 may airtightly accommodate the medium material for plasma ignition in a solid, liquid, or gas state at an early stage. The medium material for plasma ignition may also be referred to as an ionizable medium material. The chamber 110 may be supported by a support and be fixed to a first hybrid curved mirror 122.

The chamber 110 may be made of at least one selected from a dielectric material, a quartz material, suprasil quartz, sapphire, magnesium fluoride ($MgF_2$), diamond, and calcium fluoride ($CaF_2$). The material of the chamber 110 may be appropriately selected considering the medium material for plasma ignition to be accommodated in the chamber 110 and/or plasma light P at a wavelength to be generated and output by the chamber 110. In the present embodiment, the chamber 110 may be made of a material that is transparent to a microwave M, a laser L, and/or ultraviolet (UV) rays.

The chamber 110 may accommodate various medium materials for plasma ignition or excitation. For example, the medium materials for plasma ignition may be at least one selected from a noble gas, xenon (Xe), argon (Ar), neon (Ne), krypton (Kr), helium (He), heavy hydrogen ($D_2$), hydrogen ($H_2$), oxygen ($O_2$), fluorine ($F_2$), metal halide, mercury (Hg), cadmium (Cd), zinc (Zn), tin (Sn), gallium (Ga), iron (Fe), lithium (Li), sodium (Na), excimer forming gas, air, steam, metal oxide, aerosol, a fluid medium, and a regenerating medium.

However, the medium materials for plasma ignition are not limited thereto. The medium materials for plasma ignition may be generated by using a solid or liquid target (hereinafter referred to as 'target') formed within the chamber 110. For example, the medium material for plasma ignition may be generated by irradiating a laser L on the target formed within the chamber 110. The target may be a metal pool or a metal film. The target may be a solid or a liquid that is movable within the chamber 110. For example, the target may be a droplet that is movable within the chamber 110.

The medium material for plasma ignition may be a material that is introduced into the chamber 110 and is used to ignite plasma 112, or may be a material that may easily ignite plasma 112 by using a microwave M. When the plasma 112 is ignited, laser energy is supplied to the chamber 110 so as to sustain or maintain the plasma 112 or increase or maximize the intensity of the plasma 112. The process of igniting the plasma 112 by using the microwave M and maintaining or sustaining the plasma 112 by using a laser L will be described in more detail in the following section regarding the microwave generator 130 and the laser generator. In the chamber 110 according to the present embodiment, since the plasma ignition is performed by using the microwave M, no electrodes may exist within the chamber 110.

The double hybrid mirror 120 may include the first hybrid curved mirror 122 and a second hybrid curved mirror 124. The double hybrid mirror 120 may increase the efficiency of input of the microwave M and the laser L to the chamber 110 and may increase the output of the plasma light P output from the chamber 110.

The first hybrid curved mirror 122 may have a structure that surrounds the chamber 110 but is opened in a first direction (x direction). For example, the first hybrid curved mirror 122 may have a shape of an oval sphere, such as an egg-shape, which is partially cut away.

An inner surface and an outer surface of the first hybrid curved mirror 122 may have different curvatures and may be coated with different materials. For example, the outer surface of the first hybrid curved mirror 122 may be a metal coating, and the inner surface of the first hybrid curved mirror 122 may be an optical coating. The metal coating may be formed on the outer surface of the first hybrid curved mirror 122 so as to reflect most electromagnetic waves, including the microwave M. The optical coating may be formed on the inner surface of the first hybrid curved mirror 122 so as to reflect an electromagnetic wave of a particular or selected wavelength band and transmit electromagnetic waves of the other wavelength bands.

In a case where the outer surface of the first hybrid curved mirror 122, that is, the metal coating, forms an oval mirror, the outer surface of the first hybrid curved mirror 122 may have a curvature with a focus at a position at which the chamber 110 is located. In addition, in a case where the inner surface of the first hybrid curved mirror 122, that is, the optical coating, forms an oval mirror, the inner surface of the first hybrid curved mirror 122 may have a curvature with a focus at a position at which the chamber 110 is located. As described above, the outer surface and the inner surface of the first hybrid curved mirror 122 may have different curvatures. However, the focuses of the outer surface and the inner surface of the first hybrid curved mirror 122 are the position at which the chamber 110 is located, the outer surface and the inner surface of the first hybrid curved mirror 122 may have the same curvature.

Although an oval mirror has been described above, the shapes of the outer surface and the inner surface of the first hybrid curved mirror 122 according to the present embodiment are not limited to the oval mirror. For example, the outer surface and the inner surface of the first hybrid curved mirror 122 may have various curved mirror shapes. For instance, the curved mirror may include a spherical mirror. Through the outer surface or the inner surface having the curved mirror shape, light may be directed toward the position at which the chamber 110 is located.

The second hybrid curved mirror 124 may have a structure that is open in a direction (−x direction) opposite to the first direction (x direction) and is convex in the first direction. For example, the second hybrid curved mirror 124 may have a shape of a circular sphere, such as a soccer ball, which is partially cut away and faces the inner surface of the first hybrid curved mirror 122.

Inner and outer surfaces of the second hybrid curved mirror 124 may have different curvatures and may be coated with different materials. For example, the outer surface of the second hybrid curved mirror 124 may be a metal coating, and the inner surface of the second hybrid curved mirror 124 may be an optical coating. The metal coating may be formed on the outer surface of the second hybrid curved mirror 124 so as to reflect most electromagnetic waves, including the microwave M. The optical coating may be formed on the inner surface of the second hybrid curved mirror 124 so as to reflect an electromagnetic wave of a particular or selected wavelength band and transmit electromagnetic waves of the other wavelength bands.

In a case where the outer surface of the second hybrid curved mirror 124, that is, the metal coating, forms a spherical mirror, the outer surface of the second hybrid curved mirror 124 may have a curvature with a focus at a position near the position at which the chamber 110 is located. That is, the outer surface of the second hybrid curved mirror 124 may not have a curvature with the focus at the exact position where the chamber 110 is located. For example, in a case where the outer surface of the first hybrid curved mirror 122 forms an oval mirror, light may be input to the chamber 110 through the outer surface of the first hybrid curved mirror 122 even when the focus of the outer surface of the second hybrid curved mirror 124 is located near the chamber 110.

In a case where the inner surface of the second hybrid curved mirror 124, that is, the optical coating, forms a spherical mirror, the inner surface of the second hybrid curved mirror 124 may have a curvature with a focus at a position at which the output of the plasma light P is improved or maximized. As will be described below, the inner surface of the second hybrid curved mirror 124 may contribute primarily only to the reflection of the plasma light P and may not (or may minimally) function to input light to the chamber 110. Hence, unlike other surfaces, the focus of the inner surface of the second hybrid curved mirror 124 may not be the position at which the chamber 110 is located.

As described above, the outer surface and the inner surface of the second hybrid curved mirror 124 may have different curvatures. However, when satisfying the condition that the focus of the outer surface of the second hybrid curved mirror 124 is the position at which the chamber 110 is located and the focus of the inner surface of the second hybrid curved mirror 124 is the position at which the output of the plasma light P is maximized, the outer surface and the inner surface of the second hybrid curved mirror 124 may have the same curvature.

Although a spherical mirror has been described above, the shapes of the outer surface and the inner surface of the second hybrid curved mirror 124 according to the present embodiment are not limited to the spherical mirror. For example, the outer surface and the inner surface of the second hybrid curved mirror 124 may have various curved mirror shapes. For instance, the curved mirror may include an oval mirror. Through the outer surface or the inner surface having the curved mirror shape, light may be directed toward the position at which the chamber 110 is located, or the output of the plasma light P may be increased or maximized.

The microwave generator 130 may generate the microwave M and input the generated microwave M to the chamber 110. The microwave generator 130 may be a magnetron. The magnetron is a type of vacuum tube used for microwave oscillation. The magnetron is an electron tube that has two coaxial cylinders, that is, an inner cylinder as a cathode and an outer cylinder as an anode and oscillates a high-frequency microwave by applying a DC magnetic field in an axial direction. For reference, the microwave is a type of electromagnetic wave having a very high frequency of, for example, about 300 MHz to about 30 GHz, which corresponds to a medium wave and a centimeter wave.

In a low-pressure chamber, a mean free path of electrons becomes relatively long. In a low-pressure chamber, a collision frequency may be relatively low during electron oscillation (acceleration). Therefore, electrons may be more easily oscillated (accelerated) by the microwave and it may be easier to reach energy by which a material is ionized. Consequently, plasma may be more easily ignited by using the microwave within a low-pressure chamber. Based on the above principle, the plasma light source 100 according to the present embodiment may perform plasma ignition by using the microwave M within the chamber 110 that is initially at a low pressure, maintain or sustain the intensity of the plasma 112 by inputting the laser L when the plasma 112 is ignited, and increase or maximize the intensity of the plasma 112 by increasing the power of the laser L to an uppermost limit. That is, since the plasma light source 100 according to the present embodiment separately uses the microwave M and the laser L to ignite the plasma 112 and maintain the plasma 112, respectively, it may be possible to supplement drawbacks of a method of increasing the power of the laser and a method of reducing the pressure of the chamber, thus increasing or maximizing the intensity of the plasma 112.

As illustrated in FIG. 1, the microwave M generated by the microwave generator 130 may be input to the chamber 110 through a waveguide 132. By transferring the microwave M through the waveguide 132, the energy transfer efficiency of the microwave M may be increased. However, the microwave M may be directly input to the chamber 110, without using the waveguide 132. In some embodiments, in order to increase energy transfer efficiency, an outlet of the waveguide 132, through which the microwave M is output, may be disposed to directly face the chamber 110.

The above description has focused on the case where the microwave M is used for the plasma ignition. However, in the plasma light source 100 according to the present embodiment, the ignition source used for the plasma ignition is not limited to the microwave M. In addition to the microwave ignition source, various ignition sources may be used for the plasma ignition. Examples of the ignition sources may include a UV ignition source, a capacitive discharge ignition source, an inductive discharge ignition source, a high frequency ignition source, a radio frequency ignition source, a flash lamp ignition source, a pulse laser ignition source, and a pulse lamp ignition source, and/or other electromagnetic radiation sources. In a case where the discharge ignition source is used, electrodes may be provided within the chamber 110.

The laser generator (160 in FIGS. 13 to 18) may generate the laser L and input the generated laser L to the chamber 110. The laser is an acronym for Light Amplification by Stimulated Emission of Radiation and refers to light generated by a physical phenomenon or a light source. In order to avoid confusion, the light is referred to as a "laser" and the light source is referred to as a "laser generator" or a "laser light source". A wavelength band of the laser is in the range of about 0.1 μm to several hundreds of μm. The power of the laser is several hundreds of kW in a continuous wave (CW) type and is up to 1,012 W in a pulse type. Such a laser may be classified into a solid laser for high power, a gas laser that performs a highly stable operation, a small and light semiconductor laser, and a dye laser in which an oscillation frequency varies.

In the present embodiment, the laser L may be a CW laser having a relatively low energy. In particular, the laser L may be an infrared (IR)-CW laser. In addition, the laser L may be input to the chamber 110 in the form of a hollow beam, shaped, for example, like a doughnut. The hollow beam laser may be more effective to maintain the plasma 112 and increase the intensity of the plasma 112. The laser L generated by the laser generator may be input to the chamber 110 through a lens system 152 and dichroic mirrors, for example, first and second dichroic mirrors 142 and 144. In the present embodiment, the lens system 152 is illustrated as being a single lens, but the lens system 152 may include a plurality of lenses, as illustrated in FIGS. 14 to 19.

The laser L may be input to the chamber 110 at the same time as the ignition of the plasma 112 or after the ignition of the plasma 112, so as to maintain the plasma 112 and increase or maximize the intensity of the plasma 112. In the past, a pulsed laser having a very high energy has been used to ignite plasma, or the plasma ignition itself has been difficult within a low-pressure chamber. However, since the plasma light source 100 according to the present embodiment uses the microwave M to ignite the plasma 112 and separately uses the laser L to maintain the plasma 112 and increase the intensity of the plasma 112, the CW laser instead of the pulsed laser may be used while maintaining the chamber 110 at a low pressure.

As illustrated in FIG. 1, the plasma light source 100 according to the present embodiment may include the first dichroic mirror 142 and the second dichroic mirror 144. The dichroic mirror is a reflector including a plurality of thin films made of materials having different refractive indexes. The dichroic mirror reflects light of a predetermined wavelength and transmits light of the other wavelengths. As compared with a general color filter, the dichroic mirror has a very low absorption loss, and a wavelength range of light selectively reflected may be increased or decreased according to a material thickness or a structure of the dichroic mirror.

In the plasma light source 100 according to the present embodiment, the first dichroic mirror 142 may be disposed between the first hybrid curved mirror 122 and the second hybrid curved mirror 124. The first dichroic mirror 142 may transmit the microwave M and reflect the laser L and the plasma light P. The second dichroic mirror 144 may be disposed outside the double hybrid mirror 120. The second dichroic mirror 144 may reflect the laser L and transmit the plasma light P.

Specifically, since the first dichroic mirror 142 transmits the microwave M, the microwave M, which passes through the first dichroic mirror 142 without being input to the chamber 110, may be input to the chamber 110 by the reflection of the second hybrid curved mirror 124. In addition, as indicated by a dashed line, the laser L may be input to the chamber 110 by the reflection of the second dichroic mirror 144, the first dichroic mirror 142, and the first hybrid curved mirror 122.

In some embodiments, the plasma light P, which is generated by the plasma 112 within the chamber 110, may be output to the outside by the reflection of the first hybrid curved mirror 122 and the first dichroic mirror 142 and the transmission of the second dichroic mirror 144. The plasma light P, which passes through the second dichroic mirror 144, may be output to a lens system 154. Herein, the lens system 154 may be a rod lens. However, the lens system 154 is not limited to the rod lens. The plasma light P may be reflected by the second hybrid curved mirror 124 and be output again to the outside through the first hybrid curved mirror 122, the first dichroic mirror 142, and the second dichroic mirror 144.

As such, the first dichroic mirror 142 and the second dichroic mirror 144 may increase the efficiency of input of the microwave M and the laser P to the chamber 110, along with the double hybrid mirror 120, and may contribute to increase the power of the plasma light P. In addition, the degree of freedom for the position of the laser generator or the outputting direction of the plasma light P may be increased by appropriately adjusting the positions of the first dichroic mirror 142 and the second dichroic mirror 144.

Since the plasma light source 100 according to the present embodiment uses the microwave M to ignite the plasma 112 and uses the laser L to maintain or sustain the plasma 112 and increase the intensity of the plasma 112, it is possible to address or solve problems occurring in the method of increasing the power of the laser and the method of adjusting the pressure of the chamber 110 and to increase or maximize the output of the plasma laser P. In addition, since the plasma light source 100 according to the present embodiment adopts the double hybrid mirror 120, it is possible to increase the efficiency of input of the microwave M and the laser L to the chamber 110 and to increase the output of the plasma light P. Furthermore, by appropriately adjusting the positions of the first dichroic mirror 142 and the second dichroic mirror 144, it is possible to increase the output of the plasma light P and to increase the degree of freedom for the position of the laser generator or the outputting direction of the plasma light P.

Figure 2:
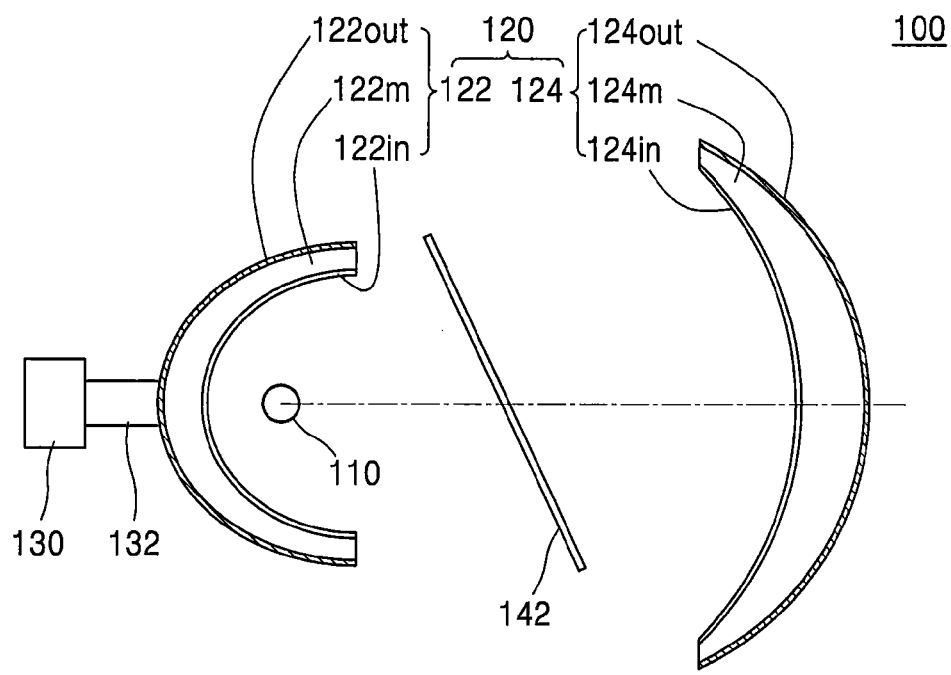
FIG. 2 is a detailed configuration diagram of a double hybrid mirror in the plasma light source of FIG. 1.

FIG. 2 is a detailed configuration diagram of the double hybrid mirror 120 in the plasma light source 100 of FIG. 1.

Referring to FIG. 2, the double hybrid mirror 120 may include the first hybrid curved mirror 122 and the second hybrid curved mirror 124. As illustrated in FIG. 2, the first hybrid curved mirror 122 may include a first mirror body 122m, a first metal coating 122out, and a first optical coating 122in. The first mirror body 122m may be made of a material that is transparent to an electromagnetic wave, in particular, a microwave.

The first metal coating 122out may be formed on an outer surface of the first mirror body 122m, and the first optical coating 122in may be formed on an inner surface of the first mirror body 122m. The first metal coating 122out may reflect a microwave. The first optical coating 122in may reflect the laser input for maintaining the plasma and reflect the plasma light generated by the plasma. For example, in a case where the input laser is IR rays and the required plasma light is UV rays, the first optical coating 122in may reflect both the IR rays and the UV rays. In a case where the input laser is near IR (NIR) rays and the required plasma light is deep UV (DUV) rays, the first optical coating 122in may reflect both the NIR rays and the DUV rays. Additionally or alternatively, the first optical coating 122in may be formed on the same principle as the above-described dichroic mirror.

The outer surface and the inner surface of the first mirror body 122m may form individual curved mirrors through the first metal coating 122out and the first optical coating 122in. For reference, the term "hybrid curved mirror" as used herein may mean that two curved mirrors are formed on a single mirror body. In a case where the curved mirror is an oval mirror or a spherical mirror, the curved mirror may have a focus corresponding to a curvature of the oval mirror or the spherical mirror. For reference, the laws of reflection of the oval mirror and the spherical mirror will be described briefly. In the case of the oval mirror, light from one focus is reflected from the oval mirror and travels toward the other focus. In the case of the spherical mirror, light input in parallel to an optical axis is reflected from the spherical mirror and travels toward a focus located on the optical axis, and light input after passing through the focus is reflected from the spherical mirror and travels in parallel to the optical axis.

In the first hybrid curved mirror 122 according to the present embodiment, a curved mirror of the outer surface formed by the first metal coating 122out (hereinafter, referred to as a "first outer curved mirror") and a curved mirror of the inner surface formed by the first optical coating 122in (hereinafter, referred to as a "first inner curved mirror") may form individual oval mirrors. A curvature of the first outer curved mirror may be different from a curvature of the first inner curved mirror. In addition, a thickness of the first mirror body 122m may not be uniform as a whole. However, the curvature of the first outer curved mirror may be equal to the curvature of the first inner curved mirror. In addition, a thickness of the first mirror body 122m may be uniform as a whole.

In some embodiments, a focus of the first outer curved mirror and a focus of the first inner curved mirror may be the position at which the chamber 110 is located. When the chamber 110 is located at the focus of the oval mirror, a microwave reflected by the first outer curved mirror may be input to the chamber 110, and a laser reflected by the first inner curved mirror may be input to the chamber 110. Therefore, it is possible to increase the efficiency of input of the microwave and the laser to the chamber 110. For reference, the focus of the oval mirror may be determined by the arrangement and the curvature of the oval mirror. Therefore, the arrangement and the curvature of the oval mirror may be adjusted so as to locate the focus of the oval mirror at a desired position.

In the first hybrid curved mirror 122 according to the present embodiment, the shapes of the first outer curved mirror and the first inner curved mirror are not limited to the oval mirror. For example, besides the oval mirror, the first outer curved mirror and the first inner curved mirror may have other curved mirror shapes. For example, the first outer curved mirror and the first inner curved mirror may be spherical mirrors. The first outer curved mirror and the first inner curved mirror may make light be directed toward the position at which the chamber 110 is located, even when first outer curved mirror and the first inner curved mirror are other curved mirrors besides the oval mirror.

As illustrated in FIG. 2, the second hybrid curved mirror 124 may include a second mirror body 124m, a second metal coating 124out, and a second optical coating 124in. The second mirror body 124m may be made of a material that is transparent to an electromagnetic wave, in particular, a microwave. The second metal coating 124out may be formed on an outer surface of the second mirror body 124m, and the second optical coating 124in may be formed on an inner surface of the second mirror body 124m.

The second metal coating 124out may reflect the microwave. The second optical coating 124in may reflect the plasma light generated by the plasma. For example, in a case where the required plasma light is UV rays, the second optical coating 124in may reflect the UV rays. In a case where the required plasma light is DUV rays, the second optical coating 124in may reflect the DUV rays. As will be described with reference to FIGS. 6A to 6C, since the laser is input through the first dichroic mirror 142, the laser is hardly reflected by the second hybrid curved mirror 124. Therefore, the second optical coating 124in may not have the function of reflecting the laser. However, in some embodiments, the second optical coating 124in may have the function of reflecting the laser.

In some embodiments, the outer surface and the inner surface of the second mirror body 124m may form individual curved mirrors through the second metal coating 124out and the second optical coating 124in. In the second hybrid curved mirror 124 according to the present embodiment, a curved mirror of the outer surface formed by the second metal coating 124out (hereinafter, referred to as a "second outer curved mirror") and a curved mirror of the inner surface formed by the second optical coating 124in (hereinafter, referred to as a "second inner curved mirror") may form individual spherical mirrors. A curvature of the second outer curved mirror may be different from a curvature of the second inner curved mirror. In addition, a thickness of the second mirror body 124m may not be uniform as a whole. However, in some embodiments, the curvature of the second outer curved mirror may be equal to the curvature of the second inner curved mirror, or the thickness of the second mirror body 124m may be uniform as a whole.

In some embodiments a focus of the second outer curved mirror may be the position at which the chamber 110 is located. When the chamber 110 is located at the focus of the spherical mirror, a microwave reflected by the second outer curved mirror may be input to the chamber 110. In some embodiments, the focus of the second outer curved mirror may not be exactly matched with the position at which the chamber 110 is located. For example, in a case where the first outer curved mirror forms an oval mirror, the focus of the second outer curved mirror may be located on the first outer curved mirror. In particular, the focus of the second outer curved mirror may be located at the center of the first outer curved mirror. Even when the focus of the second outer curved mirror is located on the first outer curved mirror, the microwave may be input to the chamber 110 by the reflection of the first outer curved mirror.

The focus of the second inner curved mirror may be located at the position at which the output of the plasma light is increased or maximized. Since the plasma light need not be input to the chamber 110, the focus of the second inner curved mirror has no relation to the position of the chamber 110. Therefore, the position at which the output of the plasma light is increased or maximized may be determined and used as the focus of the second inner curved mirror. For reference, the focus of the spherical mirror may be determined by the curvature of the spherical mirror. Therefore, the curvature of the spherical mirror may be adjusted so as to locate the focus of the spherical mirror at a desired position.

In the second hybrid curved mirror 124 according to the present embodiment, the shapes of the second outer curved mirror and the second inner curved mirror are not limited to the spherical mirror. For example, the second outer curved mirror and the second inner curved mirror may have other curved mirror shapes. For example, the second outer curved mirror and the second inner curved mirror may be oval mirrors. The second outer curved mirror and the second inner curved mirror may make light be directed toward the position at which the chamber 110 is located, even when the second outer curved mirror and the second inner curved mirror are other curved mirrors, besides the spherical mirror.

Figure 3A:
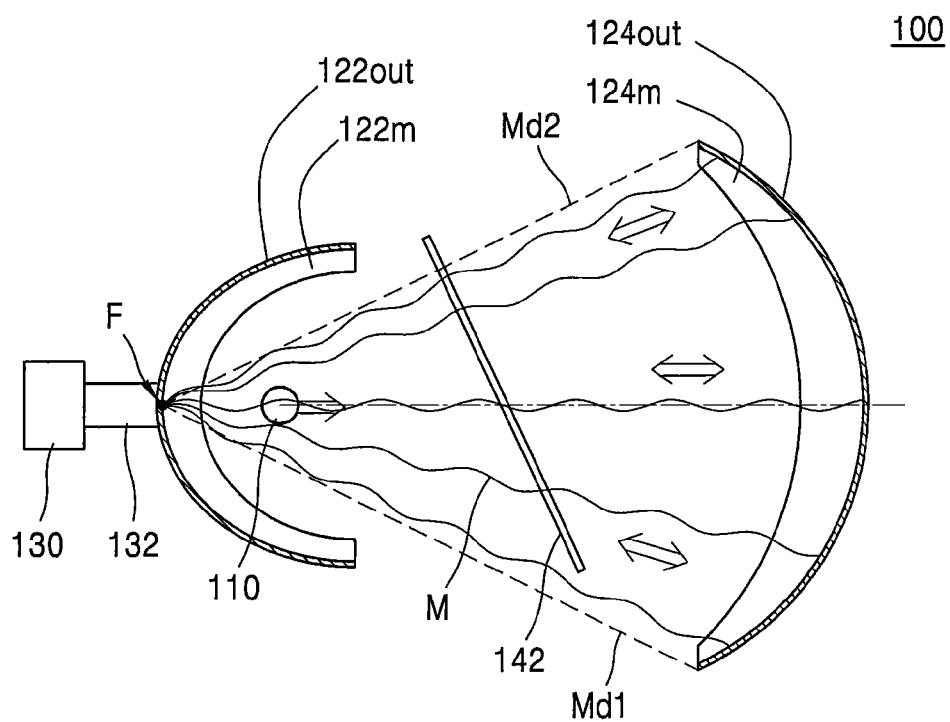
FIG. 3A is a conceptual diagram of a process of inputting a microwave to a chamber by using the double hybrid mirror in the plasma light source of FIG. 1.

FIG. 3A is a conceptual diagram of the process of inputting the microwave M to the chamber 110 by using the double hybrid mirror 120 in the plasma light source 100 of FIG. 1. For convenience, the description provided above with reference to FIGS. 1 and 2 will not be repeated again. In addition, for ease of understanding, only the first and second metal coatings of the first and second hybrid curved mirrors are illustrated.

Referring to FIG. 3A, the microwave M output through the waveguide 132 may be input to the chamber 110 and supply energy to the medium material for plasma ignition, thus contributing to the plasma ignition. In some embodiments the entire output microwave M does not contribute to the plasma ignition. A part of the output microwave M may pass through the chamber 110, or may pass through the outside of the chamber 110 and travel forward. The microwave M, which is a type of electromagnetic wave, diverges, and outlines Md1 and Md2 corresponding to a maximum divergence angle are indicated by a dashed line. Since the second metal coating 124out is formed to have a size that is larger than the maximum divergence angle, it is possible to shield the microwave M from being radiated to the outside.

As described above, the first dichroic mirror 142 is transparent to the microwave M. Therefore, the microwave M may pass through the first dichroic mirror 142 and then continue to travel. The second metal coating 124out of the second hybrid curved mirror 124 may reflect the microwave M. The reflection of the second metal coating 124out is indicated by a double-headed arrow. In a case where the second outer curved mirror formed by the second metal coating 124out is a spherical mirror, most of the reflected microwaves M may be directed toward a focus F of the spherical mirror. In addition, as illustrated in FIG. 3A, when the focus F of the spherical mirror is located on the first outer curved mirror formed by the first metal coating 122out, the microwave M may be reflected by the first outer curved mirror and be input to the chamber 110 again. As such, the first and second metal coatings 122out and 124out reflect the microwave M like the curved mirror and input the microwave M to the chamber 110 again, thus increasing the efficiency of input of the microwave M.

In some embodiments, two reflectors, which are separate from each other by a predetermined distance, may constitute or define a resonator for the microwave M. If the resonator for the microwave M is constituted or defined by using the two reflectors, the energy loss of the microwave M may be reduced or minimized. In the present embodiment, the first and second hybrid curved mirrors 122 and 124 may constitute the resonator for the microwave M. That is, the resonator for the microwave M may be constituted or defined by appropriately adjusting a distance between the first outer curved mirror of the first metal coating 122out and the second outer curved mirror of the second metal coating 124out. For reference, a length of the resonator may be determined to be $n*\lambda/4$. Herein, n may be a positive integer and $\lambda$ may be a wavelength of the microwave M.

When the second outer curved mirror is a spherical mirror, the focus F of the spherical mirror is located on the first outer curved mirror, and the first outer curved mirror and the second outer curved mirror constitute a resonator, as illustrated in FIG. 3A, this resonator is called a confocal-planar resonator. The term "planar" may be used because the position of the focus F in the first outer curved mirror is planar (see FIG. 4). As such, the first metal coating 122out and the second metal coating 124out may constitute or define the resonator for the microwave M and may have a shielding function of preventing the microwave M from being released to the outside.

Figure 3B:
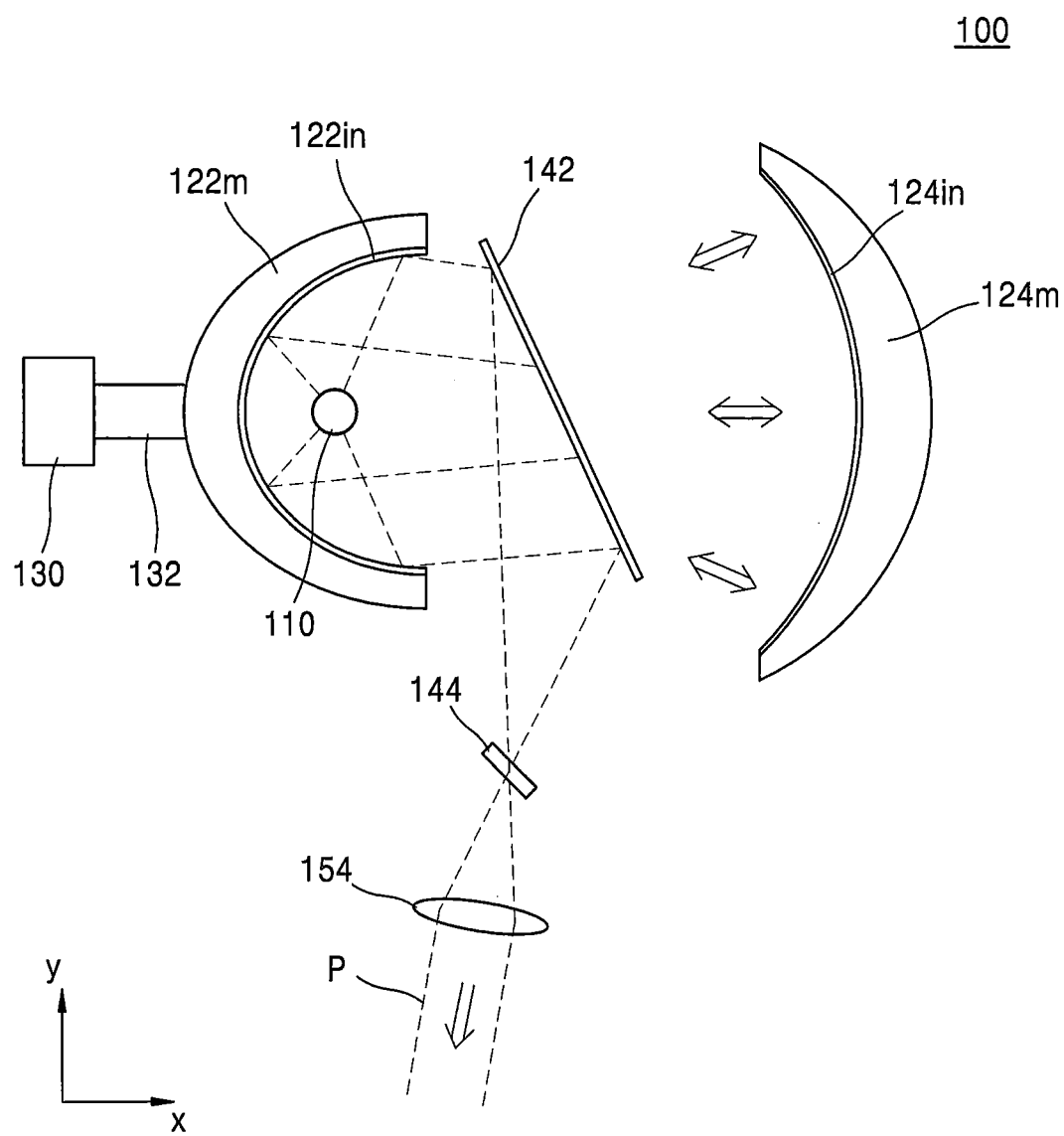
FIG. 3B is a conceptual diagram of a process of outputting plasma light by using the double hybrid mirror in the plasma light source of FIG. 1.

FIG. 3B is a conceptual diagram of the process of outputting the plasma light P by using the double hybrid mirror 120 in the plasma light source 100 of FIG. 1. For convenience, the description provided above with reference to FIGS. 1 and 2 will not be repeated again. In addition, for ease of understanding, only the first and second optical coatings of the first and second hybrid curved mirrors 122 and 124 are illustrated.

Referring to FIG. 3B, the plasma light P generated by the plasma may be radiated to the outside of the chamber 110 in all directions. The plasma light P radiated in the rear or lateral direction may be reflected by the first inner curved mirror formed by the first optical coating 122in and then travel toward the first dichroic mirror 142, and the plasma light P radiated in the front direction (x direction) may directly travel toward the first dichroic mirror 142.

As described above, the first dichroic mirror 142 may reflect the plasma light P so as to make the plasma light P be directed toward the second dichroic mirror 144. The second dichroic mirror 144 may transmit the plasma light P so as to output the plasma light P to the lens system 154. In some embodiments the second inner curved mirror formed by the second optical coating 124in may reflect the plasma light P as indicated by a double-headed arrow. Therefore, the second inner curved mirror may reflect the plasma light P, which is not reflected by the first dichroic mirror 142, so as to output the plasma light P through the reflection of the first dichroic mirror 142. The plasma light P, which is reflected by the second inner curved mirror, may be directed toward the first dichroic mirror 142 through the first inner curved mirror.

Figure 3C:
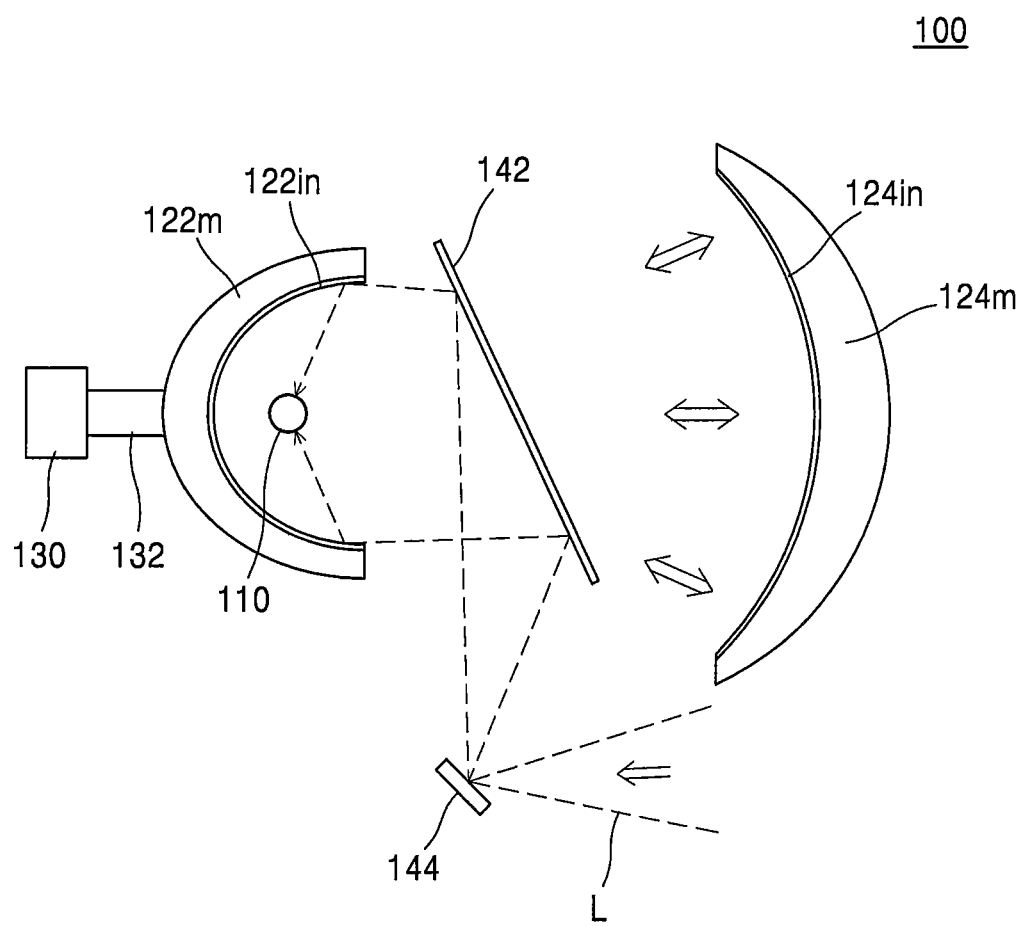
FIG. 3C is a conceptual diagram of a process of inputting a laser to a chamber by using the double hybrid mirror in the plasma light source of FIG. 1.

FIG. 3C is a conceptual diagram of the process of inputting the laser L to the chamber 110 by using the double hybrid mirror 120 in the plasma light source 100 of FIG. 1. For convenience, the description provided above with reference to FIGS. 1 and 2 will not be repeated again. In addition, for ease of understanding, only the first and second optical coatings of the first and second hybrid curved mirrors 122 and 124 are illustrated.

Referring to FIG. 3C, the laser L, which is output from the laser generator (160 in FIGS. 13 to 18), may be reflected by the second dichroic mirror 144 and be then directed toward the first dichroic mirror 142. The laser L may be reflected again by the first dichroic mirror 142 and be input to the chamber 110 or travel toward the first inner curved mirror formed by the first optical coating 122in. The laser L, which travels toward the first inner curved mirror, may be reflected by the first inner curved mirror and be then input to the chamber 110. The laser L, which is input to the chamber 110, may contribute to maintain the plasma and increase or maximize the intensity of the plasma.

The first inner curved mirror may increase the efficiency of input of the laser L to the chamber 110. In addition, the position of the laser generator may be adjusted by appropriately adjusting the positions of the first and second dichroic mirrors 142 and 144. That is, the first and second dichroic mirrors 142 and 144 may increase the degree of freedom for the position of the laser generator.

Figure 4:
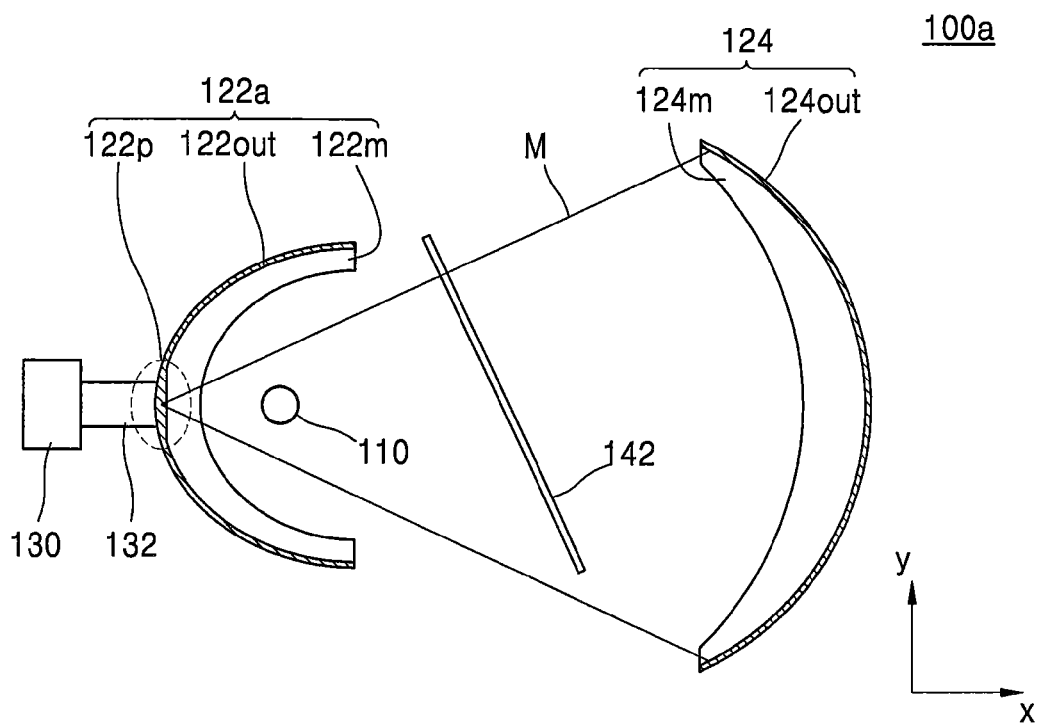
FIGS. 4 and 5 are schematic configuration diagrams illustrating modifications of a double hybrid mirror applied to plasma light sources according to embodiments of the inventive concepts.
Figure 5:
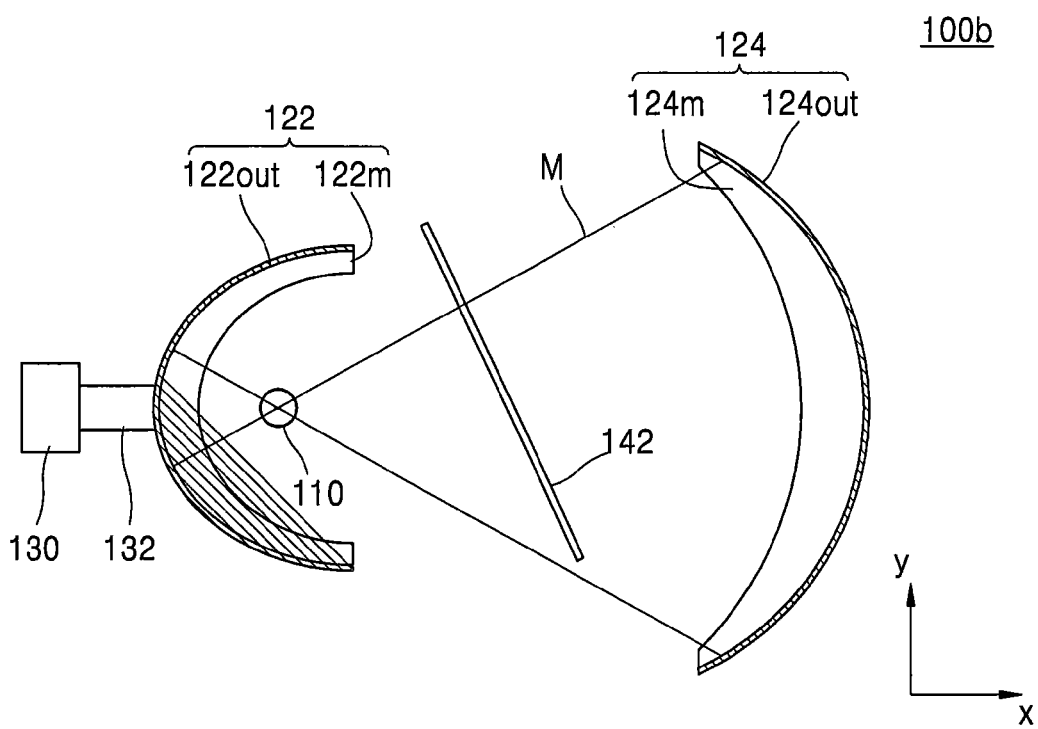

FIGS. 4 and 5 are configuration diagrams illustrating modifications of a double hybrid mirror applied to plasma light sources 100a and 100b according to embodiments of the inventive concepts. For convenience, the description provided above with reference to FIGS. 1 and 2 will not be repeated again. In addition, for ease of understanding, only the first and second metal coatings of the first and second hybrid curved mirrors are illustrated.

Referring to FIG. 4, the plasma light source 100a according to the present embodiment may differ from the plasma light source 100 of FIG. 1 or 2 in terms of a configuration of a first hybrid curved mirror 122a. That is, in the plasma light source 100a according to the present embodiment, the first hybrid curved mirror 122a may include a metal planar mirror 122p formed at the center of the first metal coating 122out. The metal planar mirror 122p may be a metal coating formed on the outer surface of the first mirror body 122m, as in the case of the first metal coating 122out, but may have a planar surface perpendicular to the first direction (x direction).

In some embodiments the second outer curved mirror formed by the second metal coating 124out may form a spherical mirror, and a focus of the spherical mirror may be located on the metal planar mirror 122p. Therefore, the microwave M reflected from the second outer curved mirror may travel toward the metal planar mirror 122p, be reflected by the metal planar mirror 122p, and be then input to the chamber 110. Since the metal planar mirror 122p is formed at or near the center of the first metal coating 122out, the efficiency of input of the microwave M to the chamber 110 may be increased.

In addition, as described above, a resonator for the microwave M may be constituted or defined by appropriately adjusting a distance between the metal planar mirror 122p and the spherical mirror. Furthermore, a confocal-planar resonator may be constituted or defined by adjusting the curvature of the spherical mirror such that the focus thereof is located on the metal planar mirror 122p.

Referring to FIG. 5, the plasma light source 100b according to the present embodiment may differ from the plasma light source 100 of FIG. 1 or 2, in that the focus of the first outer curved mirror formed by the first metal coating 122out is matched with the focus of the second outer curved mirror formed by the second metal coating 124out. Specifically, the first outer curved mirror may form an oval mirror, and the focus of the first outer curved mirror may be the position at which the chamber 110 is located. In some embodiments, the second outer curved mirror may form a spherical mirror, and the focus of the second outer curved mirror may be the position at which the chamber 110 is located. That is, the focus or focal point of the oval mirror may be matched with the focus of the spherical mirror.

When the first and second outer curved mirrors are configured as described above, the microwave M may be directly input to the chamber 110 by the reflection of the second outer curved mirror that is the spherical mirror. In addition, the microwave M may also be input to the chamber 110 by the reflection of the first outer curved mirror that is the oval mirror. As such, the efficiency of input of the microwave M to the chamber 110 may be further increased when the first outer curved mirror forms the oval mirror, the second outer curved mirror forms the spherical mirror, and the focus of the oval mirror is matched with the focus of the spherical mirror.

Although the case where the first outer curved mirror is the oval mirror has been described above, the first outer curved mirror may be a spherical mirror. In a case where the first outer curved mirror is a spherical mirror and the focus of the first outer curved mirror is matched with the focus of the second outer curved mirror, the description above may be equally applied thereto.

In some embodiments, in a case where the first outer curved mirror is a spherical mirror, a resonator may be constituted or defined by appropriately adjusting a distance between the first outer curved mirror and the second outer curved mirror. In addition, the focus of the first outer curved mirror and the focus of the second outer curved mirror may be matched with each other by appropriately adjusting the curvature of either or both of the first outer curved mirror and the second outer curved mirror. A resonator in which the focuses of the two spherical mirrors match each other is referred to as a concentric resonator.

Figure 6A:
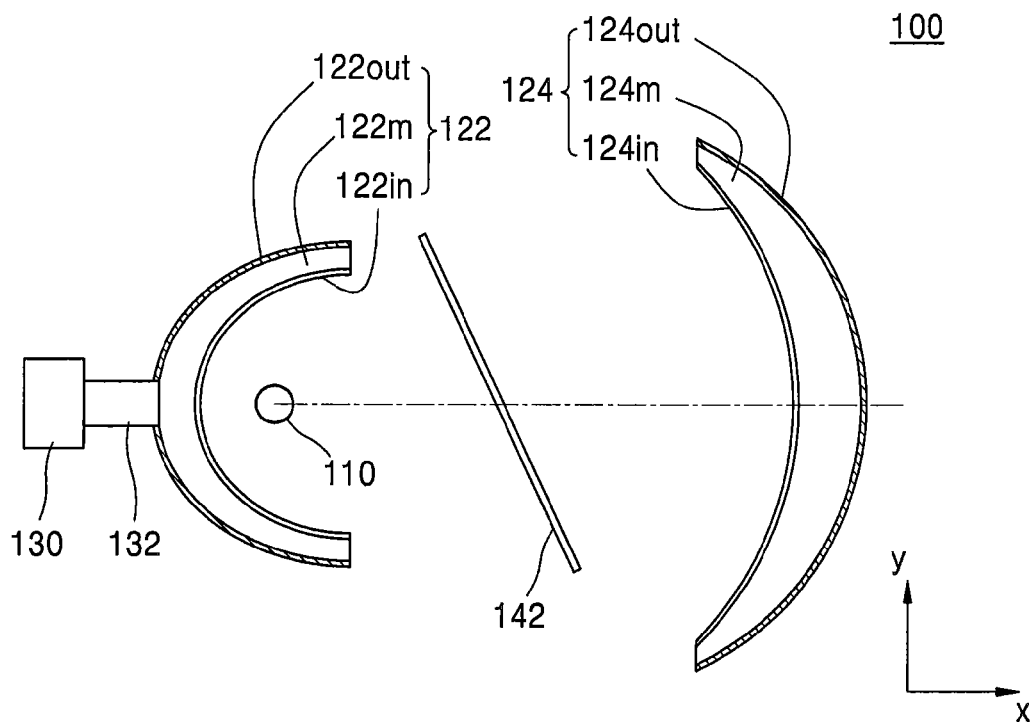
FIGS. 6A to 6C are configuration diagrams illustrating a connection structure of a waveguide and a double hybrid mirror in plasma light sources according to embodiments of the inventive concepts.
Figure 6B:
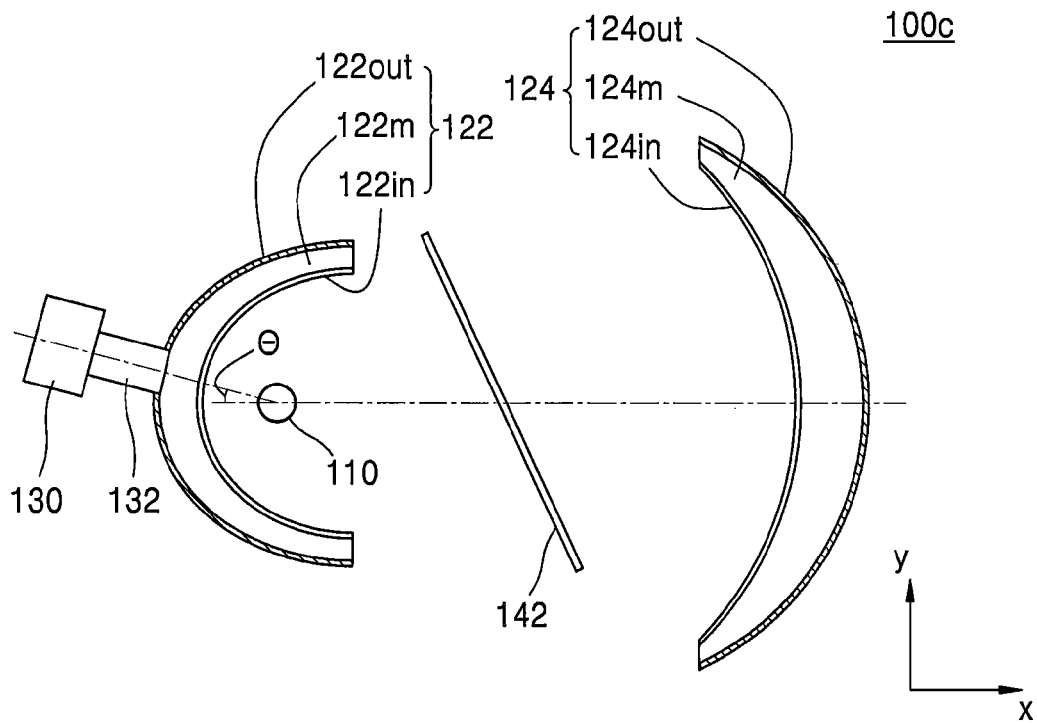
Figure 6C:
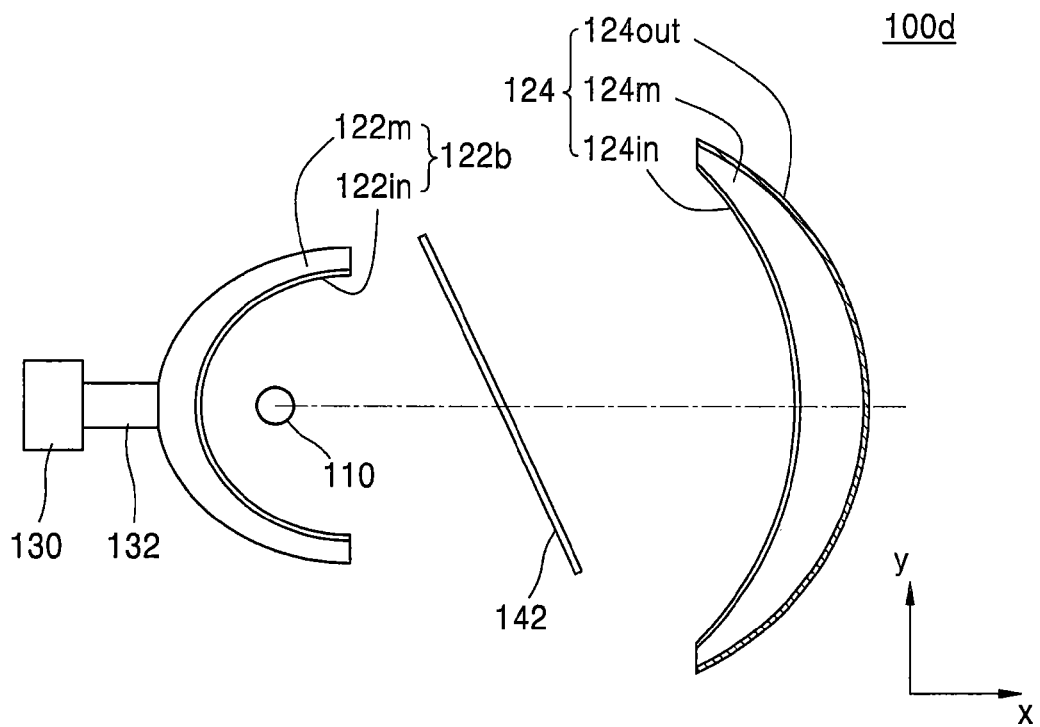

FIGS. 6A to 6C are configuration diagrams illustrating a connection structure of a waveguide and a double hybrid mirror in plasma light sources according to embodiments of the inventive concepts. For convenience, the description provided above with reference to FIGS. 1 and 2 will not be repeated again.

Referring to FIG. 6A, a microwave, which is generated by a microwave generator 130, may be transferred through a waveguide 132, pass through a first hybrid curved mirror 122, and be then input to a chamber 110. As described above, a first metal coating 122out is formed on an outer surface of a first mirror body 122m of the first hybrid curved mirror 122, and the first metal coating 122out reflects the microwave. Therefore, as illustrated in FIG. 6A, the first metal coating 122out may not be formed at a position at which the waveguide 132 is connected to the first hybrid curved mirror 122. In addition, the waveguide 132 may directly contact the first mirror body 122m of the first hybrid curved mirror 122.

In FIGS. 1 to 5, the first metal coating 122out is illustrated as being formed on the entire outer surface of the first mirror body 122m, and the waveguide 132 is illustrated as contacting the first metal coating 122out. However, this is derived because the connection structure of the waveguide 132 and the first hybrid curved mirror 122 is illustrated in a planar fashion. In practice, the first metal coating 122out may not be formed at the position at which the waveguide 132 is connected to the first hybrid curved mirror 122 as illustrated in FIG. 6A. For example, when the waveguide 132 is connected to the first hybrid curved mirror 122 not at a position coinciding with the plane of the page but at a position slightly under or above the plane of the page, a portion in which the first metal coating 122out is not formed may not be shown like FIGS. 1 to 5.

Referring to FIG. 6B, a plasma light source 100c according to the present embodiment may differ from the plasma light source 100 of FIG. 6A in terms of a connection position of a waveguide 132. In the plasma light source 100 of FIG. 6A, the waveguide 132 is connected to the first hybrid curved mirror 122 such that the waveguide 132 is matched with a long dashed short dashed line passing through the chamber 110 in the first direction (x direction). However, in the plasma light source 100c according to the present embodiment, a waveguide 132 may be connected to a first hybrid curved mirror 122 such that the waveguide 132 forms a predetermined angle (θ) with the long dashed short dashed line that is, at an angle with respect to an axis of symmetry of the mirror 122. Nevertheless, a direction of an outlet of the waveguide 132 may be directed toward a chamber 110.

In FIG. 6B, the waveguide 132 is disposed above the long dashed short dashed line, but it is obvious that the waveguide 132 may be disposed under or below the long dashed short dashed line. In addition, the waveguide 132 may be connected to the first hybrid curved mirror 122 at a position slightly under or above the plane of the page. In this case, a portion in which the first metal coating 122out is not formed may not be shown in FIG. 6B.

Referring to FIG. 6C, a plasma light source 100d according to the present embodiment may differ from the plasma light source 100 of FIG. 6A in terms of a configuration of a first hybrid curved mirror 122b. In the plasma light source 100d according to the present embodiment, the first hybrid curved mirror 122b may include only a first mirror body 122m and a first optical coating 122in. That is, no metal coating may be formed on the outer surface of the first mirror body 122m.

In such a configuration, most of the microwaves may be input to a chamber 110 directly and by reflection of a second outer curved mirror formed by a second metal coating 124out, and a leakage of the microwave hardly occurs. For example, in a case where the second outer curved mirror is a spherical mirror, a focus of which is located at the chamber 110, most of the microwaves may be input to the chamber 110 while travelling in the first direction (x direction) and the microwave passing through the chamber 110 may be directly input to the chamber 110, which is the focus of the spherical mirror, through the reflection of the second outer curved mirror.

Figure 7:
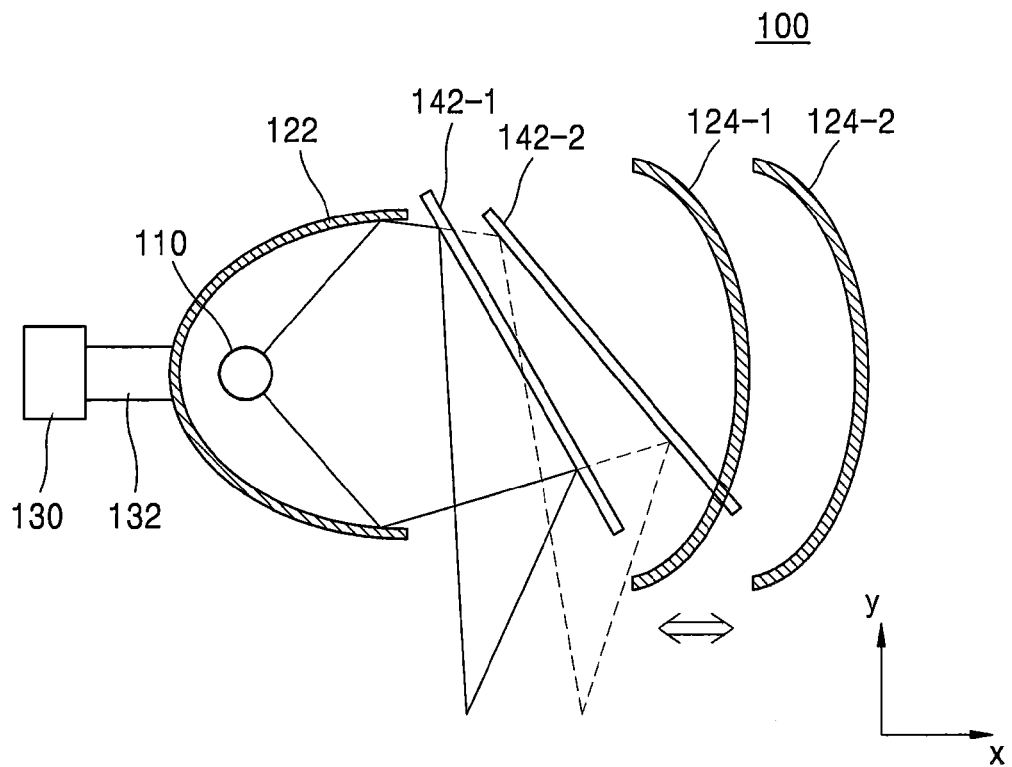
FIG. 7 is a conceptual diagram of a principle of adjusting a length of a resonator, depending on a wavelength of a microwave, in plasma light sources according to embodiments of the inventive concepts.

FIG. 7 is a conceptual diagram of a principle of adjusting a length of a resonator, depending on a wavelength of a microwave, in plasma light sources according to embodiments of the inventive concepts.

Referring to FIG. 7, the resonator for the microwave may be constituted or defined by appropriately adjusting a distance between the first hybrid curved mirror 122 and the second hybrid curved mirror 124. Specifically, the resonator for the microwave may be constituted or defined by appropriately adjusting a distance between the first metal coating (122out in FIG. 2) of the first hybrid curved mirror 122 and the second metal coating (124out in FIG. 2) of the second hybrid curved mirror 124 such that the distance therebetween satisfies the resonance condition according to the wavelength of the microwave. For example, a resonator may be constituted or defined by arranging a second hybrid curved mirror 124-1 at a first position with respect to a first microwave having a first wavelength. In addition, a resonator may be constituted or defined by arranging a second hybrid curved mirror 124-2 at a second position with respect to a second microwave having a second wavelength. As indicated by a double-headed arrow, the resonator may be constituted or defined by adjusting the position of the second hybrid curved mirror 124 in the first direction (x direction) according to the wavelength of the microwave.

In a case where the first-direction position of the second hybrid curved mirror 124 is adjusted according to the wavelength of the microwave so as to constitute the resonator, a position and an angle of a first dichroic mirror 142 disposed between the first hybrid curved mirror 122 and the second hybrid curved mirror 124 may be changed. For example, in a case where the resonator is constituted or defined by arranging the second hybrid curved mirror 124-1 at the first position with respect to the first microwave, the first dichroic mirror 142-1 may be disposed at a first position and at a first angle. In a case where the resonator is constituted or defined by arranging the second hybrid curved mirror 124-2 at the second position with respect to the second microwave, the first dichroic mirror 142-2 may be disposed at a second position and at a second angle. The reason why the position and the angle of the first dichroic mirror 142 are changed according to the length of the resonator is that the efficiency of the plasma light may be reduced through the first dichroic mirror 142 when the length of the resonator is changed. Therefore, even when the length of the resonator is changed, the position and the angle of the first dichroic mirror 142 may not be changed if the output of the plasma light is increased or maximized by the first dichroic mirror 142.

Figure 8:
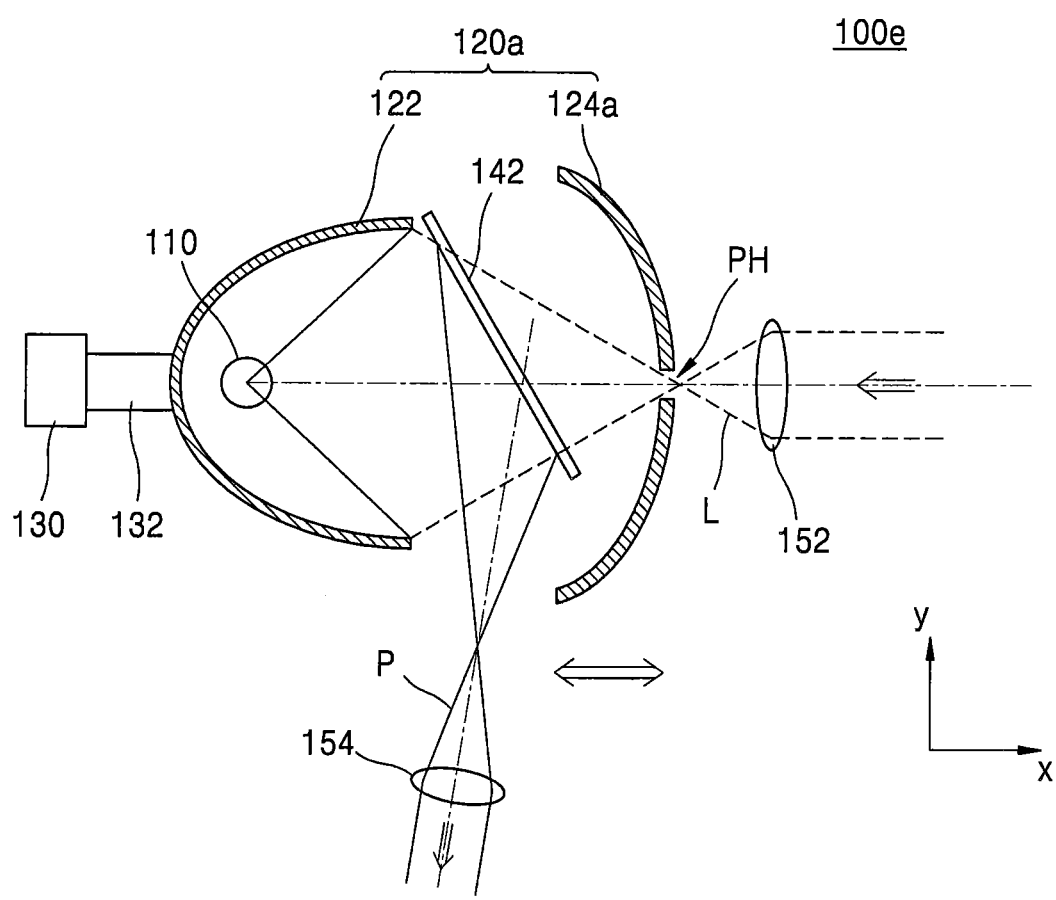
FIGS. 8 and 9 are schematic configuration diagrams of plasma light sources configured to input a laser to a chamber through a pin-hole, according to embodiments of the inventive concepts.
Figure 9:
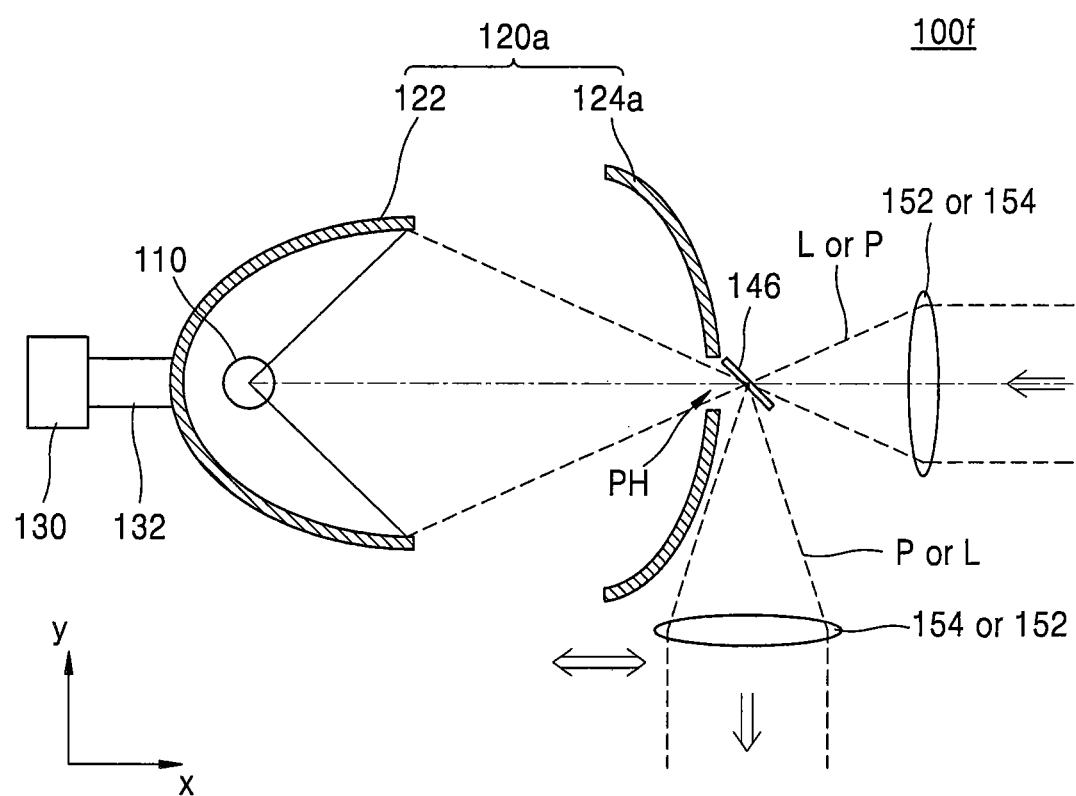

FIGS. 8 and 9 are schematic configuration diagrams of plasma light sources configured to input a laser L to a chamber 110 through a pin-hole aperture PH, according to embodiments of the inventive concepts. For convenience, the description provided above with reference to FIGS. 1 and 2 will not be repeated again.

Referring to FIG. 8, a plasma light source 100e according to the present embodiment may differ from the plasma light source 100 of FIG. 1 in terms of a configuration that inputs the laser L to the chamber 110.

Specifically, the pin-hole aperture PH may be formed in a second hybrid curved mirror 124a. The laser L may penetrate the second hybrid curved mirror 124a through the pin-hole aperture PH and be input to the chamber 110. The second hybrid curved mirror 124a may be substantially the same as the second hybrid curved mirror 124 described above with reference to FIG. 1 or 2, except that the pin-hole aperture PH is formed. That is, the second hybrid curved mirror 124a may include a mirror body, a metal coating formed on an outer surface of the mirror body, and an optical coating formed on an inner surface of the mirror body.

A size of the pin-hole aperture PH may be less than a half wavelength of the microwave. For example, in a case where the pin-hole aperture PH is formed to have a circular shape, a diameter of the pin-hole aperture PH may be less than a half wavelength of the microwave. This is because if the size of the pin-hole aperture PH is greater than or equal to a half wavelength of the microwave, the microwave may leak out through the pin-hole aperture PH. In some embodiments, as illustrated in FIG. 8, the pin-hole aperture PH may be formed to pass through the entire second hybrid curved mirror 124a, that is, the mirror body, the metal coating, and the optical coating. However, the pin-hole aperture PH may be formed to pass through only the metal coating. For example, in a case where the mirror body and the optical coating are transparent to the laser L, no pin-hole aperture PH may be formed in the mirror body and the optical coating of the second hybrid curved mirror 124a.

Since the laser L is input through the pin-hole aperture PH of the second hybrid curved mirror 124a, the second dichroic mirror may not be provided in the plasma light source 100e. In addition, since the laser L has to pass through a first dichroic mirror 142, the first dichroic mirror 142 may be transparent to the laser L. Since the first dichroic mirror 142 contributes to the output of the plasma light P, the first dichroic mirror 142 may have a function of reflecting the plasma light P.

The laser L may penetrate the second hybrid curved mirror 124a through the pin-hole aperture PH and travel toward the first dichroic mirror 142. After passing through the first dichroic mirror 142, a part of the laser L may travel toward the first hybrid curved mirror 122, and a part of the laser L may be directly input to the chamber 110. The laser L, which travels toward the first hybrid curved mirror 122, may be reflected by the first optical coating (122in in FIG. 2) of the first hybrid curved mirror 122 and be input to the chamber 110.

In some embodiments, the plasma light P, which is generated by the plasma within the chamber 110, may be output to the outside by the reflection of the first dichroic mirror 142 or the reflection of the first optical coating (122in in FIG. 2) and the first dichroic mirror 142. In contrast to the plasma light source 100 of FIG. 1, since the plasma light source 100e according to the present embodiment has no second dichroic mirror, the plasma light P may be reflected by the first dichroic mirror 142 and be directly output to the lens system 154.

As described above with reference to FIG. 7, a double-headed arrow under the second hybrid curved mirror 124a may mean that the plasma light source 100e according to the present embodiment may constitute or define the resonator by arranging the position of the second hybrid curved mirror 124a according to the wavelength of the microwave.

Referring to FIG. 9, a plasma light source 100f according to the present embodiment may be similar to the plasma light source 100e of FIG. 8 in that the laser L may be input through the pin-hole aperture PH of the second hybrid curved mirror 124a, but may differ from the plasma light source 100e of FIG. 8 in terms of a configuration that outputs the plasma light P.

Specifically, a pin-hole aperture PH may be formed in the second hybrid curved mirror 124a. In addition, a third dichroic mirror 146 may be disposed adjacent to the pin-hole aperture PH. In the plasma light source 100f according to the present embodiment, the laser L may be input through the pin-hole aperture PH and the third dichroic mirror 146, and the plasma light P may be output through the pin-hole aperture PH and the third dichroic mirror 146. In some embodiments, as illustrated in FIG. 9, no separate dichroic mirrors may exist between the first hybrid curved mirror 122 and the second hybrid curved mirror 124a.

The third dichroic mirror 146 may transmit the laser L and reflect the plasma light P, or may reflect the laser L and transmit the plasma light P. For example, in a case where the third dichroic mirror 146 transmits the laser L and reflects the plasma light P, a first lens system 152 that inputs the laser L may be disposed on the right side of the third dichroic mirror 146, and a second lens system 154 that outputs the plasma light P may be disposed under the third dichroic mirror 146. For example, in a case where the third dichroic mirror 146 reflects the laser L and transmits the plasma light P, the position of the first lens system 152 for the laser L and the position of the second lens system 154 for the plasma light P may be exchanged with each other.

The laser L may penetrate the third dichroic mirror 146 or be reflected by the third dichroic mirror 146 and penetrate the second hybrid curved mirror 124a through the pin-hole aperture PH. A part of the laser L penetrating the second hybrid curved mirror 124a may travel toward the first hybrid curved mirror 122, and a part of the laser L may be directly input to the chamber 110. The laser L, which travels toward the first hybrid curved mirror 122, may be reflected by the first optical coating (122in in FIG. 2) of the first hybrid curved mirror 122 and be then input to the chamber 110.

In some embodiments, the plasma light P, which is generated by the plasma within the chamber 110, may directly travel toward the pin-hole aperture PH or travel toward the pin-hole aperture PH by the reflection of the first optical coating (122in in FIG. 2), and then penetrate the second hybrid curved mirror 124a through the pin-hole aperture PH. The plasma light P, which penetrates the second hybrid curved mirror 124a, may be reflected by the third dichroic mirror 146 or penetrate the third dichroic mirror 146, and be then output to the outside.

The size of the pin-hole aperture PH may be less than a half wavelength of the microwave, so as to reduce or prevent the microwave from passing through the pin-hole aperture PH. In the plasma light source 100f according to the present embodiment, since the plasma light P passes through the pin-hole aperture PH, the pin-hole aperture PH may be formed to pass through the entire second hybrid curved mirror 124a, that is, the optical coating, the mirror body, and the metal coating. Since the mirror body is transparent to the laser L and the plasma light P, the pin-hole aperture PH may be formed in only the optical coating and the metal coating.

Figure 10:
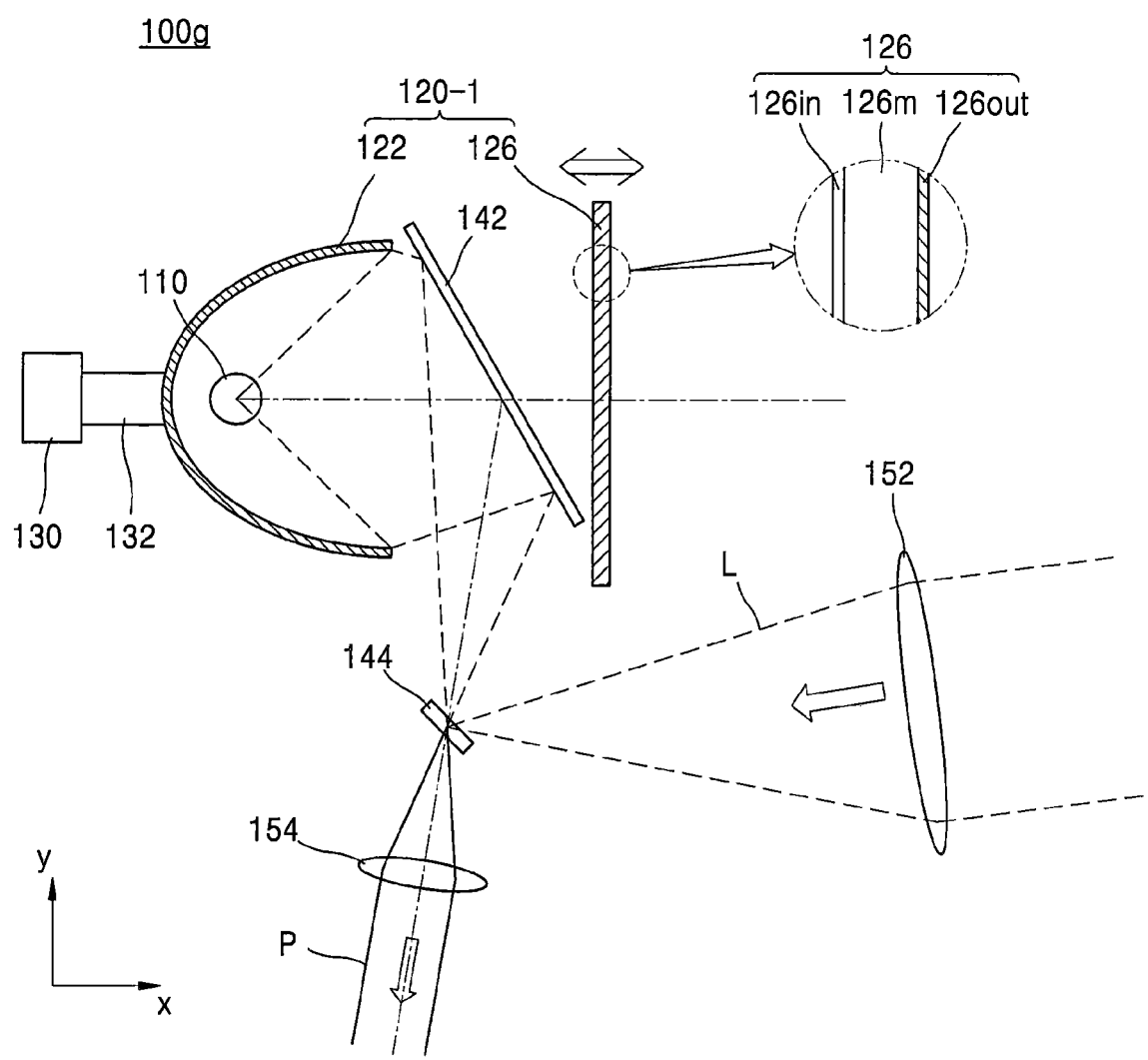
FIGS. 10 to 12 are schematic configuration diagrams of plasma light sources, in which a planar mirror is adopted in a double hybrid mirror, according to embodiments of the inventive concepts.
Figure 11:
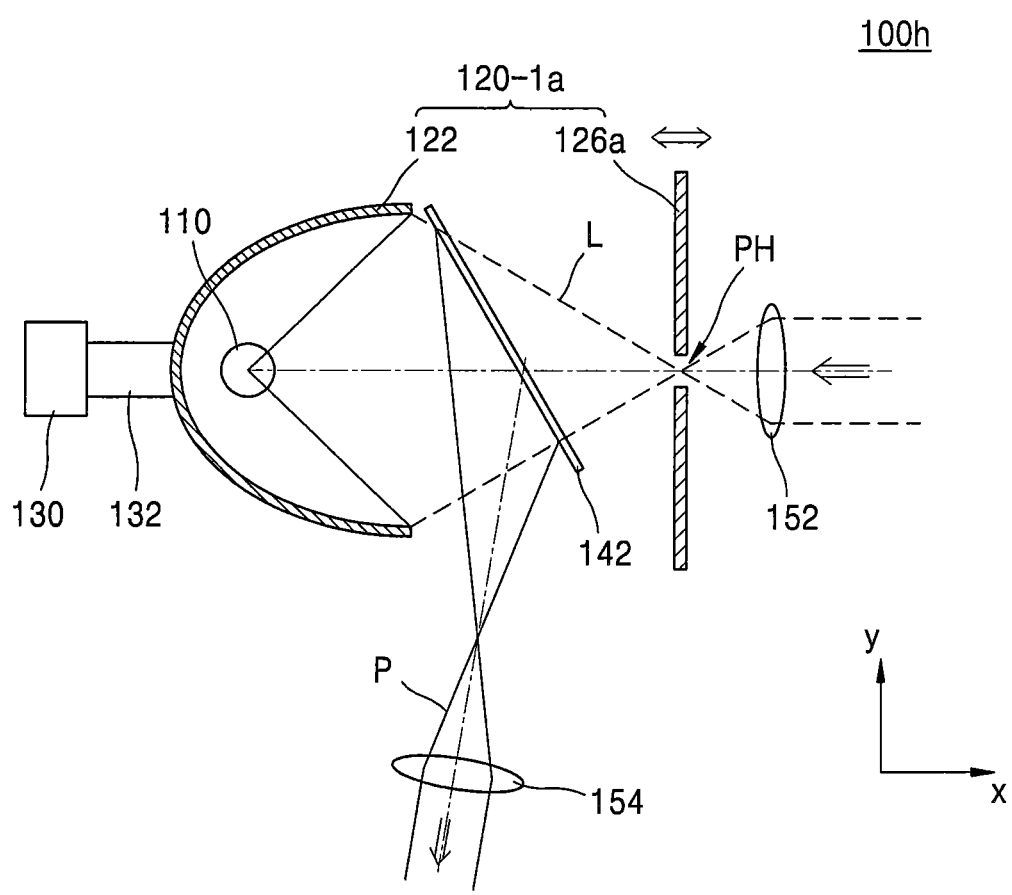
Figure 12:
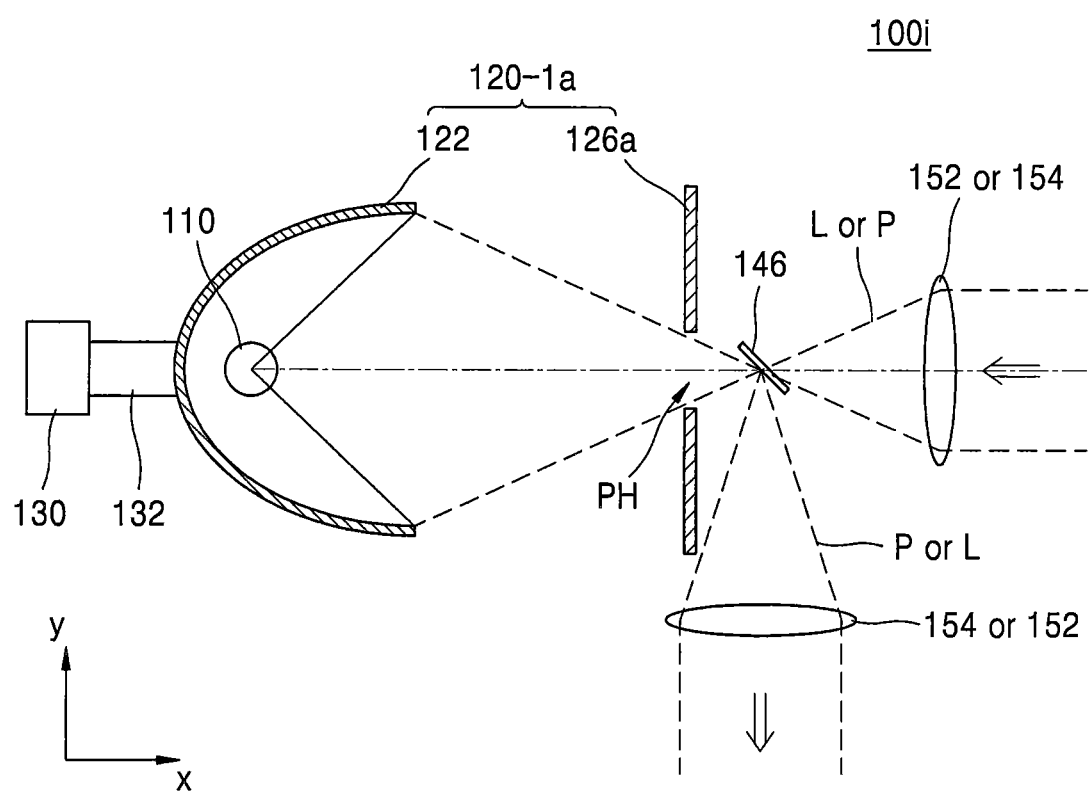

FIGS. 10 to 12 are schematic configuration diagrams of plasma light sources, in which a planar mirror is adopted in a double hybrid mirror, according to embodiments of the inventive concepts. For convenience, the description provided above with reference to FIGS. 1 and 2 will not be repeated again.

Referring to FIG. 10, a plasma light source 100g according to the present embodiment may differ from the plasma light source 100 of FIG. 1 in terms of a configuration of a double hybrid mirror 120-1. In the plasma light source 100g according to the present embodiment, the double hybrid mirror 120-1 may include a first hybrid curved mirror 122 and a hybrid planar mirror 126. The first hybrid curved mirror 122 is substantially the same as that described above with reference to FIG. 1 or 2.

As illustrated in FIG. 10, the hybrid planar mirror 126 may have a flat plate shape perpendicular to the first direction (x direction). As in the case of the first hybrid curved mirror 122, the hybrid planar mirror 126 may include a mirror body 126m, and an optical coating 126in and a metal coating 126out formed on both sides of the mirror body 126m. The optical coating 126in may be formed on a first surface of the mirror body 126m in a direction facing the first hybrid curved mirror 122, and the metal coating 126out may be formed on a second surface of the mirror body 126m, which is opposite to the first surface.

The hybrid planar mirror 126 may have a similar characteristic to the second hybrid curved mirror 124, except that the hybrid planar mirror 126 has a flat plate shape. For example, the mirror body 126m may be transparent to the microwave, the laser L, and the plasma light P. The metal coating 126out may reflect most electromagnetic waves, including the microwave. The optical coating 126in may be transparent to the microwave and reflect the plasma light P. In some embodiments, since the laser L is hardly input to the hybrid planar mirror 126 due to the light input structure, the optical coating 126in may not reflect the laser L. However, in some embodiments, the optical coating 126in may be configured to reflect the laser L.

In some embodiments, the metal coating 126out may constitute or define a resonator together with the first metal coating (122out in FIG. 2) of the first hybrid curved mirror 122. That is, the metal coating 126out and the first metal coating 122out may constitute or define a resonator for the microwave by appropriately adjusting a distance between the metal coating 126out and the first metal coating 122out so as to satisfy a resonance condition according to the wavelength of the microwave.

In addition, since the first metal coating 122out is curved, the resonance condition of the first metal coating 122out and the metal coating 126out may be calculated on the assumption that the center of the first metal coating 122out is planar. That is, the distance between the center of the first metal coating 122out and the metal coating 126out may be adjusted to satisfy the resonance condition. Therefore, the resonator according to the present embodiment may be referred to as a planar resonator. In some embodiments, as illustrated in FIG. 4, a planar mirror may be formed at the center of the first metal coating 122out.

As in the case of the first and second metal coatings 122out and 124out of FIG. 1, the first metal coating 122out and the metal coating 126out may have a function of shielding the microwave.

Referring to FIG. 11, a plasma light source 100h according to the present embodiment may differ from the plasma light source 100g of FIG. 10 in terms of a configuration that inputs a laser L to a chamber 110. Specifically, a pin-hole aperture PH may be formed in a hybrid planar mirror 126a. The laser L may penetrate the hybrid planar mirror 126a through the pin-hole aperture PH and travel toward the chamber 110. The hybrid planar mirror 126a may be substantially the same as the hybrid planar mirror 126 described above with reference to FIG. 10, except that the pin-hole aperture PH is formed in the hybrid planar mirror 126a. That is, the hybrid planar mirror 126a may include a mirror body, an optical coating formed on a first surface of the mirror body in a direction facing the first hybrid curved mirror 122, and a metal coating formed on a second surface of the mirror body, which is opposite to the first surface.

A size of the pin-hole aperture PH may be less than a half wavelength of the microwave. For example, in a case where the pin-hole aperture PH is formed to have a circular shape, a diameter of the pin-hole aperture PH may be less than a half wavelength of the microwave. The pin-hole aperture PH may be formed to pass through the entire hybrid planar mirror 126a, that is, the mirror body, the metal coating, and the optical coating, or may be formed to pass through only the metal coating. For example, in a case where the mirror body and the optical coating are transparent to the laser L, no pin-hole aperture PH may be formed in the mirror body and the optical coating.

Since the laser L is input through the pin-hole aperture PH of the hybrid planar mirror 126a, the second dichroic mirror may not be provided in the plasma light source 100h. In addition, since the laser L has to pass through a first dichroic mirror 142, the first dichroic mirror 142 may be transparent to the laser L. Since the first dichroic mirror 142 contributes to the output of the plasma light P, the first dichroic mirror 142 may have a function of reflecting the plasma light P.

The laser L may penetrate the hybrid planar mirror 126a through the pin-hole aperture PH and travel toward the first dichroic mirror 142. After passing through the first dichroic mirror 142, a part of the laser L may travel toward the first hybrid curved mirror 122, and a part of the laser L may be directly input to the chamber 110. The laser L, which has travelled toward the first hybrid curved mirror 122, may be reflected by the first optical coating (122in in FIG. 2) of the first hybrid curved mirror 122 and be then input to the chamber 110.

In some embodiments, the plasma light P, which is generated by the plasma within the chamber 110, may be output to the outside by the reflection of the first dichroic mirror 142 or the reflection of the first optical coating (122in in FIG. 2) and the first dichroic mirror 142. In contrast to the plasma light source 100g of FIG. 10, since the plasma light source 100h according to the present embodiment has no second dichroic mirror, the plasma light P may be reflected by the first dichroic mirror 142 and be directly output to a lens system 154.

Referring to FIG. 12, a plasma light source 100i according to the present embodiment may be similar to the plasma light source 100h of FIG. 11 in that a laser L may be input through a pin-hole aperture PH of a hybrid planar mirror 126a, but may differ from the plasma light source 100h of FIG. 11 in terms of a configuration that outputs plasma light P.

Specifically, a pin-hole aperture may be formed in the hybrid planar mirror 126a, and a third dichroic mirror 146 may be disposed adjacent to the pin-hole aperture PH. In the plasma light source 100i according to the present embodiment, the laser L may be input through the pin-hole aperture PH and the third dichroic mirror 146 and the plasma light P may be output through the pin-hole aperture PH and the third dichroic mirror 146. In some embodiments, as illustrated in FIG. 12, no separate dichroic mirrors may exist between the first hybrid curved mirror 122 and the hybrid planar mirror 126a.

As in the case of the third dichroic mirror 146 described above with reference to FIG. 9, the third dichroic mirror 146 may transmit the laser L and reflect the plasma light P, or may reflect the laser L and transmit the plasma light P. Therefore, as described above, a position of a lens system 152 for the laser L and a position of a lens system 154 for the plasma light P may be changed with respect to the third dichroic mirror 146 according to the reflection and transmission characteristic of the third dichroic mirror 146.

The laser L may penetrate the third dichroic mirror 146 or be reflected by the third dichroic mirror 146, and penetrate the hybrid planar mirror 126a through the pin-hole aperture PH. A part of the laser L penetrating the hybrid planar mirror 126a may travel toward the first hybrid curved mirror 122 and a part of the laser L may be directly input to the chamber 110. The laser L, which travels toward the first hybrid curved mirror 122, may be reflected by the first optical coating (122in in FIG. 2) of the first hybrid curved mirror 122 and be then input to the chamber 110.

In some embodiments, the plasma light P, which is generated by the plasma within the chamber 110, may directly travel toward the pin-hole aperture PH or travel toward the pin-hole aperture PH through the reflection of the first optical coating (122in in FIG. 2), and then pass through the hybrid planar mirror 126a through the pin-hole aperture PH. The plasma light P, which penetrates the hybrid planar mirror 126a, may be reflected by the third dichroic mirror 146 or pass through the third dichroic mirror 146, and be then output to the outside.

As described above, the size of the pin-hole aperture PH may be less than a half wavelength of the microwave, so as to reduce or prevent the microwave from passing through the pin-hole aperture PH. In some embodiments, in the plasma light source 100i according to the present embodiment, since the plasma light P passes through the pin-hole aperture PH, the pin-hole aperture PH may be formed to pass through the entire hybrid planar mirror 126a, that is, the optical coating, the mirror body, and the metal coating. Since the mirror body is transparent to the laser L and the plasma light P, the pin-hole aperture may be formed in only the optical coating and the metal coating.

Figure 13:
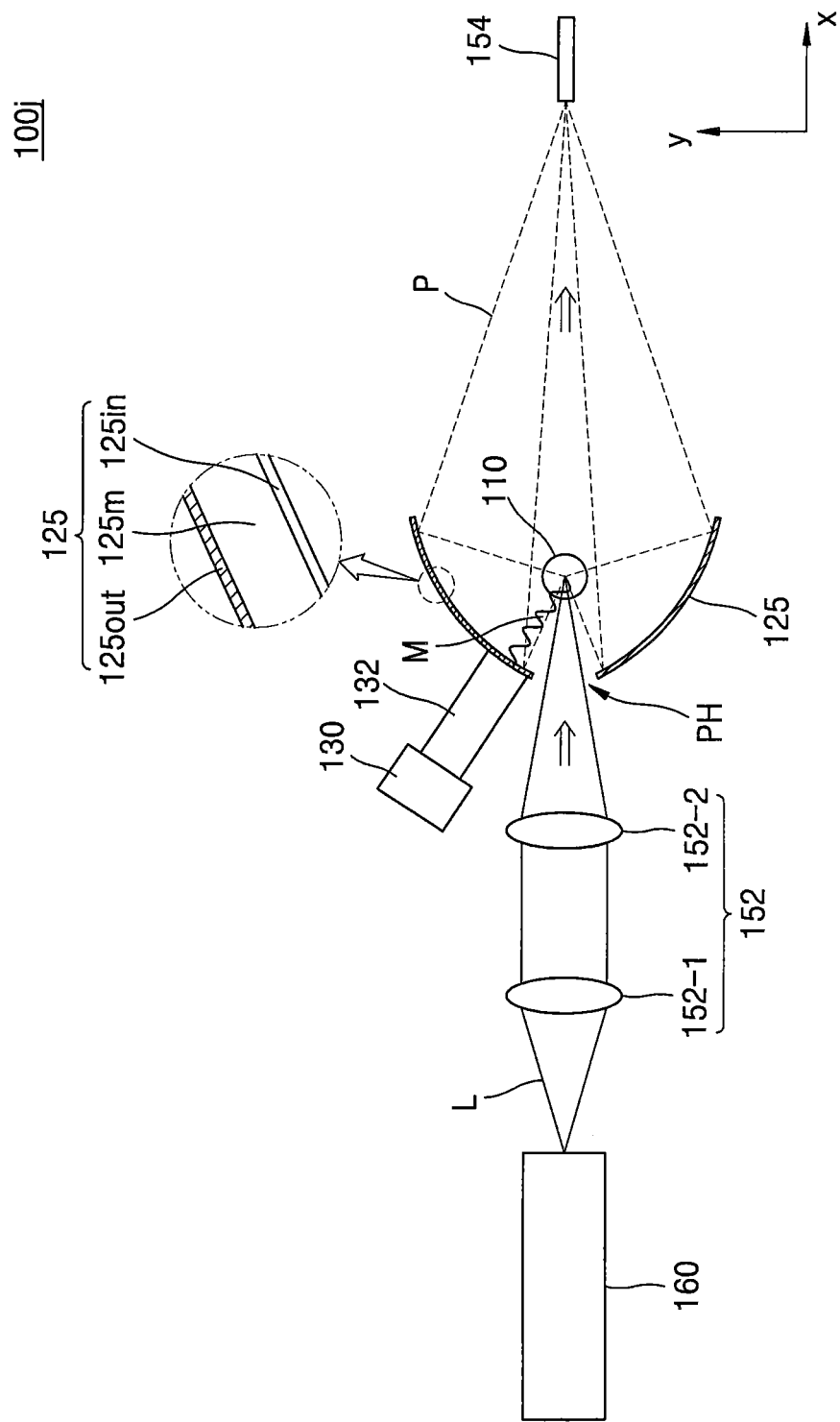
FIGS. 13 to 18 are schematic configuration diagrams of plasma light sources configured to directly input a laser to a chamber through a curved mirror surrounding the chamber, according to embodiments of the inventive concepts.
Figure 14:
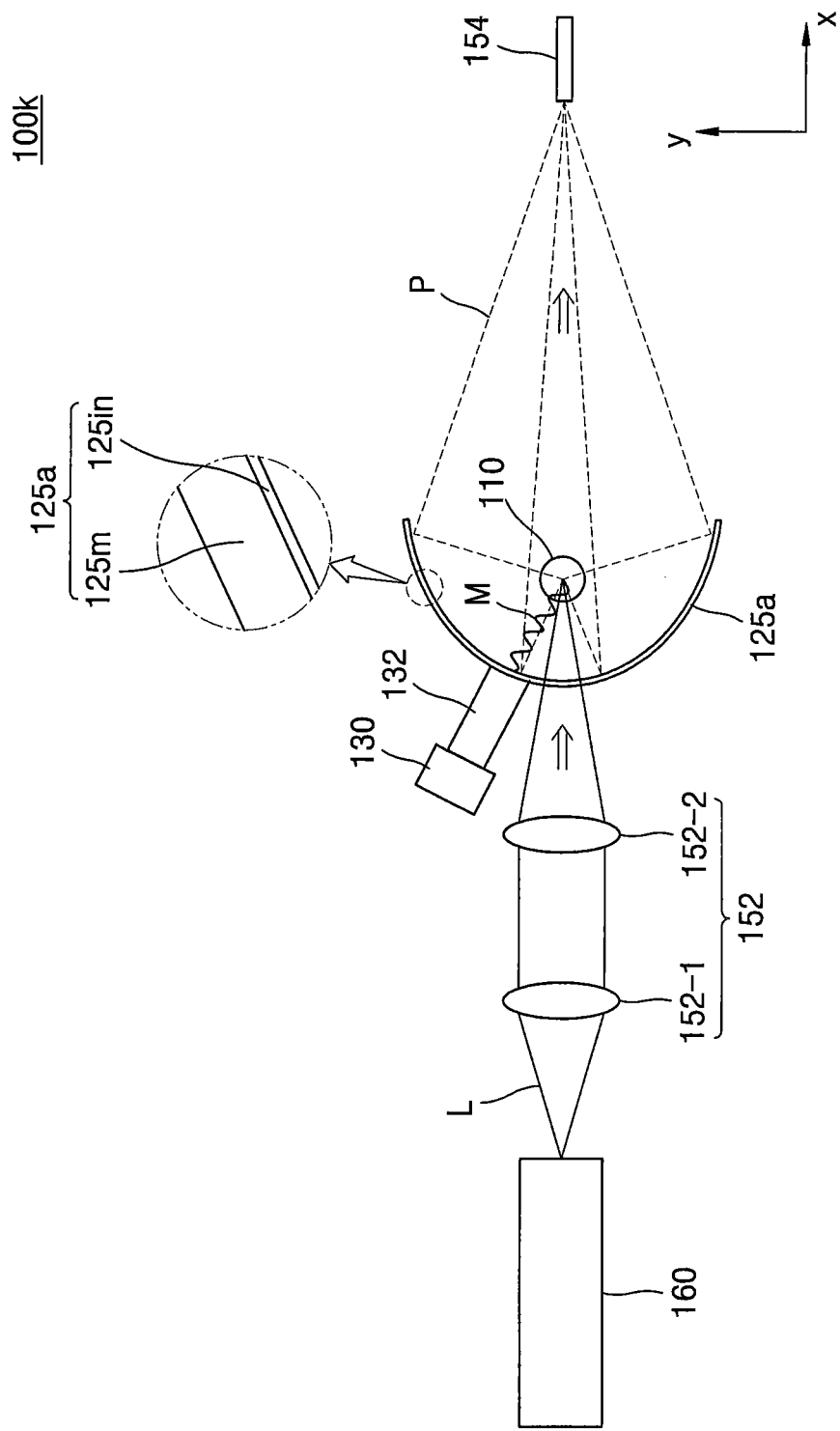

FIGS. 13 and 14 are schematic configuration diagrams of plasma light sources configured to directly input a laser L to a chamber 110 through a curved mirror surrounding the chamber 110 chamber, according to embodiments of the inventive concepts. For convenience, the description provided above with reference to FIGS. 1 and 2 will not be repeated again.

Referring to FIG. 13, a plasma light source 100j according to the present embodiment may include a chamber 110, a curved mirror 125, a microwave generator 130, and a laser generator 160.

The chamber 110 may be a sealed container capable of airtightly accommodating a medium material for plasma ignition. The material of the chamber 110 and the kind of the medium material for plasma ignition are substantially the same as those described above with reference to FIG. 1.

As in the case of the first hybrid curved mirror 122 of FIG. 1, the curved mirror 125 may have a structure that surrounds the chamber 110 but is opened in a first direction (x direction). For example, the curved mirror 125 may have a shape of an oval sphere, such as an egg shape, which is partially cut away, or may have a shape of a circular sphere, such as a soccer ball shape, which is partially cut away. The curved mirror 125 may be a hybrid curved mirror in which an inner surface and an outer surface thereof have different curvatures and are coated with different materials.

As can be seen from the enlarged portion, the curved mirror 125 may include a mirror body 125m, a metal coating 125out formed on an outer surface of the mirror body 125m, and an optical coating 125in formed on an inner surface of the mirror body 125m. The metal coating 125out may be formed on the outer surface of the mirror body 125m so as to reflect most electromagnetic waves, including the microwave M. For example, the metal coating 125out may have a function of shielding the chamber 110 from external electromagnetic waves and have a function of reflecting the microwave M input to the curved mirror 125 and inputting the microwave M to the chamber 110.

The optical coating 125in may be formed on the inner surface of the mirror body 125m so as to reflect an electromagnetic wave of a selected wavelength band and transmit an electromagnetic wave of the other wavelength bands. For example, the optical coating 125in may be transparent to the microwave M and reflect the plasma light P. In some embodiments, the optical coating 125in may be transparent to the laser L.

The metal coating 125out of the curved mirror 125 may form an oval mirror or a spherical mirror. In a case where the metal coating 125out forms an oval mirror or a spherical mirror, the oval mirror or the spherical mirror may have a curvature with a focus at a position at which the chamber 110 is located. Therefore, the microwave M, which is reflected by the metal coating 125out, may travel toward the chamber 110 that is the focus.

The optical coating 125in of the curved mirror 125 may form an oval mirror. In a case where the optical coating 125in forms an oval mirror, the oval mirror may have a curvature with a focus at a position at which the chamber 110 is located. In a case where both of the metal coating 125out and the optical coating 125in form an oval mirror, a curvature of the oval mirror formed by the metal coating 125out may be different from a curvature of the oval mirror formed by the optical coating 125in. However, in a case where the focus of the oval mirror formed by the metal coating 125out and the focus of the oval mirror formed by the optical coating 125in are matched with the position at which the chamber 110 is located, the curvatures of the oval mirrors may be the same.

Although the oval mirror or the spherical mirror has been described above, the metal coating 125out and the optical coating 125in of the curved mirror 125 are not limited to the oval mirror or the spherical mirror. For example, the metal coating 125out and the optical coating 125in of the curved mirror 125 may have various curved mirror shapes. The metal coating 125out and the optical coating 125in having the above-described curved mirrors may input the microwave M to the chamber 110 and efficiently output the plasma light P to the outside.

In some embodiments, a pin-hole aperture PH may be formed at the center of the curved mirror 125, and the laser L may be input to the chamber 110 through the pin-hole aperture PH. A size of the pin-hole aperture PH may be less than a half wavelength of the microwave M. In some embodiments, the size of the pin-hole aperture PH may be greater than or equal to a half wavelength of the microwave M. For example, in a case where the microwave M is hardly input or output to the pin-hole aperture PH, the size of the pin-hole aperture PH may be formed regardless of the wavelength of the microwave M.

The pin-hole aperture PH may be formed to pass through the entire curved mirror 125, that is, the mirror body 125m, the metal coating 125out, and the optical coating 125in. In addition, the pin-hole aperture PH may be formed to pass through only the metal coating 125out and not in the mirror body 125m and the optical coating 125in. That is, in a case where the mirror body 125m and the optical coating 125in are transparent to the laser L, the laser L may pass through the curved mirror 125 even when no pin-hole aperture PH is formed in the mirror body 125m and the optical coating 125in.

The microwave generator 130 is a device that generates a microwave to be input to the chamber 110. For example, the microwave generator 130 may be a magnetron. The microwave, which is generated by the microwave generator 130, may be input to the chamber 110 through a waveguide 132. An outlet of the waveguide 132 may be directed toward the chamber 110 so as to directly input the microwave to the chamber 110 through the waveguide 132.

As described above with reference to FIG. 6, in a case where the curved mirror 125 includes the metal coating 125out, the metal coating 125out may not be formed on the outer surface of the mirror body 125m at a portion in which the waveguide 132 is connected thereto. The waveguide 132 is connected above the pin-hole aperture PH in FIG. 13, but the connection position of the waveguide 132 is not limited thereto. For example, the waveguide 132 may be disposed and connected to any portion of the curved mirror 125 as long as the waveguide 132 does not overlap the pin-hole aperture PH. In addition, in some embodiments, the waveguide 132 may be disposed in a direction of an opening of the curved mirror 125, without being connected to the curved mirror 125. In this case, the microwave may be directly input to the chamber 110, without passing through the curved mirror 125. In a case where the waveguide 132 is disposed in the direction of an opening of the curved mirror 125, the metal coating 125out may increase the efficiency of input of the microwave to the chamber 110.

The laser generator 160 may generate a laser L and input the generated laser L to the chamber 110. In contrast to the plasma light source 100 of FIG. 1, the laser generator 160 according to the present embodiment may input the laser L to the chamber 110 through the pin-hole aperture PH formed in the curved mirror 125. As illustrated in FIG. 13, the laser generator 160 may collimate and focus the laser through lens system 152 and then input the laser L to the chamber 110 through the pin-hole aperture PH. The lens system 152 may include a first lens 152-1 and a second lens 152-2. The first lens 152-1 may collimate the laser L and the second lens 152-2 may focus the laser L. The first lens 152-1 may be an aspheric lens, and the second lens 152-2 may be an axicon lens. The lens system 152 is not limited to the above example and may include a plurality of various lenses so as to increase the efficiency of input of the laser L to the chamber 110.

In the plasma light source 100j according to the present embodiment, the laser L, which is generated by the laser generator 160, may be a CW laser having a relatively low energy. In particular, the laser L may be an IR-CW laser. The laser L may be input to the chamber 110 at the same time as the plasma ignition or after the plasma ignition, so as to maintain the plasma and maximize the intensity of the plasma. In the past, a pulsed laser having a very high energy has been used to ignite plasma within a low-pressure chamber, or the plasma ignition itself has been difficult within a low-pressure chamber. However, since the plasma light source 100j according to the present embodiment uses the microwave to ignite the plasma and uses the laser L to maintain the plasma and increase the intensity of the plasma, the CW laser instead of the pulsed laser may be used while maintaining the chamber 110 at a low pressure.

The plasma light P, which is generated by the plasma within the chamber 110, may be output to the lens system 154 directly or by the reflection of the optical coating 125in. For example, the lens system 154 may be a rod lens. In a case where the optical coating 125in forms an oval mirror, the position of the lens system 154 may be another focus or focal point, in addition to the chamber 110. Therefore, according to the reflection principle or characteristics of the oval mirror, the plasma light P, which is output from the chamber 110 being one focus or at one focal point, may be reflected by the optical coating 125in and travel toward the lens system 154 being another focus or at another focal point. However, the lens system 154 is not limited to the rod lens. In order to increase the efficiency of output of the plasma light P, the lens system 154 may include a plurality of various lenses.

The plasma light source 100*j* according to the present embodiment may not include dichroic lenses. In addition, the plasma light source 100*j* according to the present embodiment may include a single curved mirror 125. In this case, the plasma light P may be directly output in a first direction (x direction). Therefore, as in the case of the plasma light source 100 of FIG. 1, the plasma light source 100*j* according to the present embodiment may separately perform the process of igniting the plasma and the process of maintaining the plasma and increasing the intensity of the plasma. In addition, the plasma light source 100*j* according to the present embodiment does not include the dichroic lens and the second hybrid curved mirror, thereby simplifying the overall structure of the plasma light source 100*j*. In addition, due to the simplified structure of the optical light source 100*j*, it is possible to actually increase the probability of realizing a plasma light source employing the principle of separately performing the process of igniting the plasma and the process of maintaining the plasma and increasing the intensity of the plasma.

Referring to FIG. 14, a plasma light source 100*k* according to the present embodiment is substantially similar to the plasma light source 100*j* of FIG. 13, except for a curved mirror 125*a*. As can be seen from the enlarged portion, the curved mirror 125*a* may not include a metal coating. That is, the curved mirror 125*a* may include only a mirror body 125*m* and an optical coating 125in formed on an inner surface of the mirror body 125*m*.

Since the curved mirror 125*a* does not include the metal coating, no pin-hole aperture may be formed in the curved mirror 125*a*. The mirror body 125*m* and the optical coating 125in may be transparent to a laser L. Therefore, even when no pin-hole aperture is formed in the curved mirror 125*a*, the laser L may penetrate the curved mirror 125*a* and be input to a chamber 110.

In some embodiments, a microwave generator 130 also may be directly connected to the mirror body 125*m* through a waveguide 132 and input a microwave M to the chamber 110. As described above, the waveguide 132 may be disposed and connected to any position of the curved mirror 125*a*, except for the position to which the laser L is input. In some cases, the waveguide 132 may be disposed in a direction of an opening of the curved mirror 125*a*.

Figure 15:
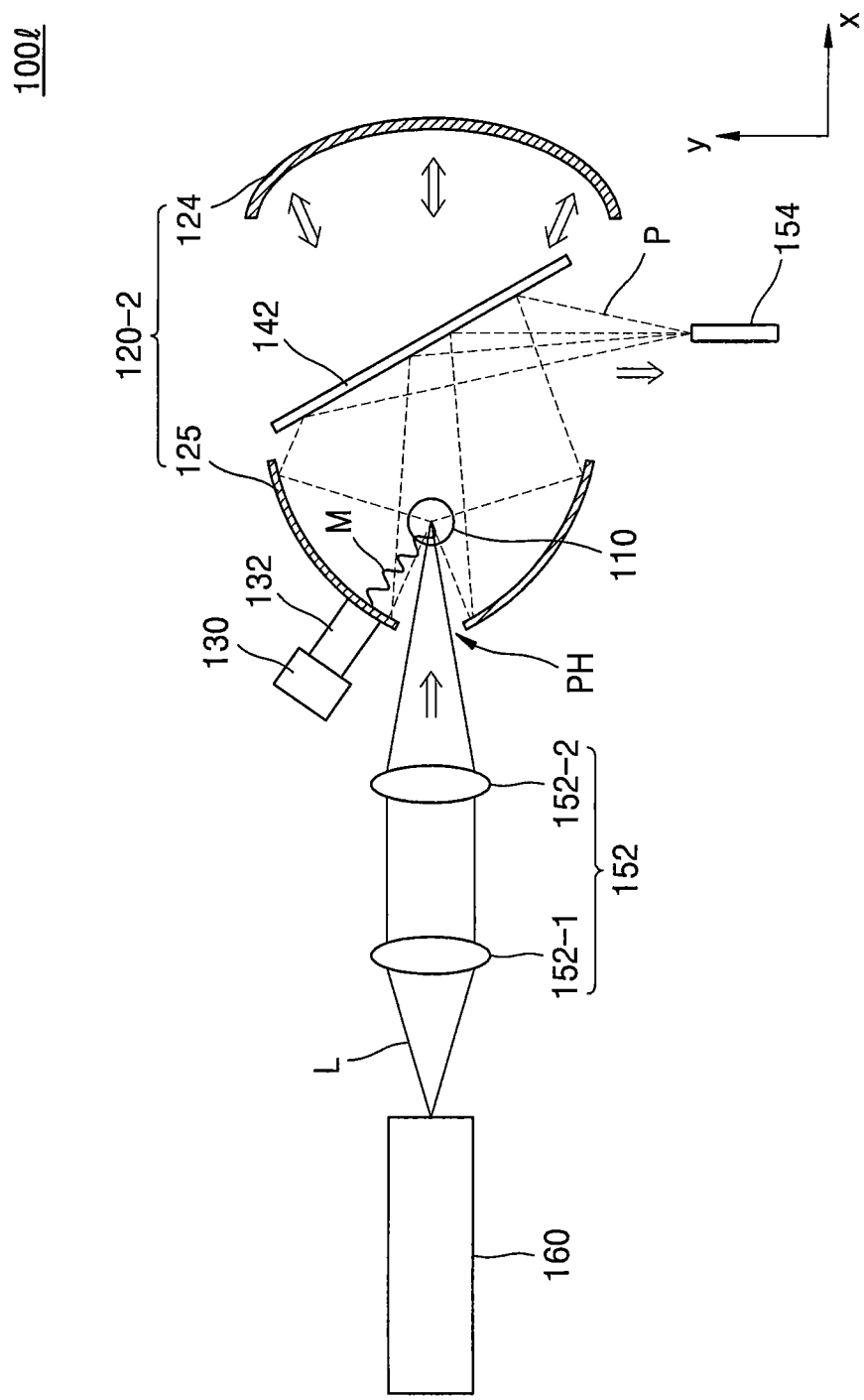

Referring to FIG. 15, a plasma light source 100*l* according to the present embodiment may be a combination of the plasma light source 100 of FIG. 1 and the plasma light source 100*j* of FIG. 13. Specifically, as in the case of the plasma light source 100 of FIG. 1, the plasma light source 100*l* may include a double hybrid mirror 120-2, and a dichroic mirror 142 may be disposed between a first hybrid curved mirror 125 and a second hybrid curved mirror 124. In addition, as in the case of the plasma light source 100*j* of FIG. 13, a pin-hole aperture PH may be formed in the first hybrid curved mirror 125.

The double hybrid mirror 120-2 may be similar to the double hybrid mirror 120 of FIG. 1 or 2, except that the pin-hole aperture PH is formed in the first hybrid curved mirror 125. In addition, the first hybrid curved mirror 125 may be substantially the same as the curved mirror 125 of FIG. 13. That is, the first hybrid curved mirror 125 may include a first mirror body 125*m*, a first metal coating 125out, and a first optical coating 125in, and the second hybrid curved mirror 124 may include a second mirror body 124*m*, a second metal coating 124out, and a second optical coating 124in. In addition, the transmission characteristics of the first hybrid curved mirror 125 and/or the second hybrid curved mirror 124 with respect to an electromagnetic wave may be similar to those described above with reference to FIG. 1. That is, the first mirror body 125*m* and/or the second mirror body 124*m* may be transparent to the microwave M. The first metal coating 125out/or and the second metal coating 124out may reflect most electromagnetic waves, including the microwave M. Therefore, the first metal coating 125out and/or the second metal coating 124out may shield the microwave M and constitute a resonator for the microwave M by appropriately adjusting a distance therebetween. The first optical coating 125in and the second optical coating 124in may reflect the plasma light P and the laser L. In some embodiments, the first mirror body 125*m* and the first optical coating 125in may be transparent to the laser L. In this case, the pin-hole aperture PH may be formed in only the first metal coating 125out.

As in the case of the plasma light source 100*j* of FIG. 13, the plasma light source 100*l* according to the present embodiment may input the laser L to the chamber 110 through the pin-hole aperture PH of the first hybrid curved mirror 125. In addition, the microwave M may be input to the chamber 110 through the waveguide 132 connected to any portion of the first hybrid curved mirror 125, except for the pin-hole aperture PH. The first metal coating 125out may not be formed at a portion in which the waveguide 132 is connected to the first hybrid curved mirror 125.

The dichroic mirror 142 may be transparent to the microwave M and the laser L and reflect the plasma light P. Therefore, the plasma light P, which is output by the plasma within the chamber 110, may be output to the lens system 154, for example, the rod lens, by the reflection of the dichroic mirror 142 or the reflection of the optical coating 125in and the dichroic mirror 142. In some embodiments, the second optical coating 124in may reflect the laser L and the plasma light P. Therefore, a double-headed arrow drawn near the second hybrid curved mirror 124 means that the second hybrid curved mirror 124 may reflect all of the microwave M, the laser L, and plasma light P.

Figure 16:
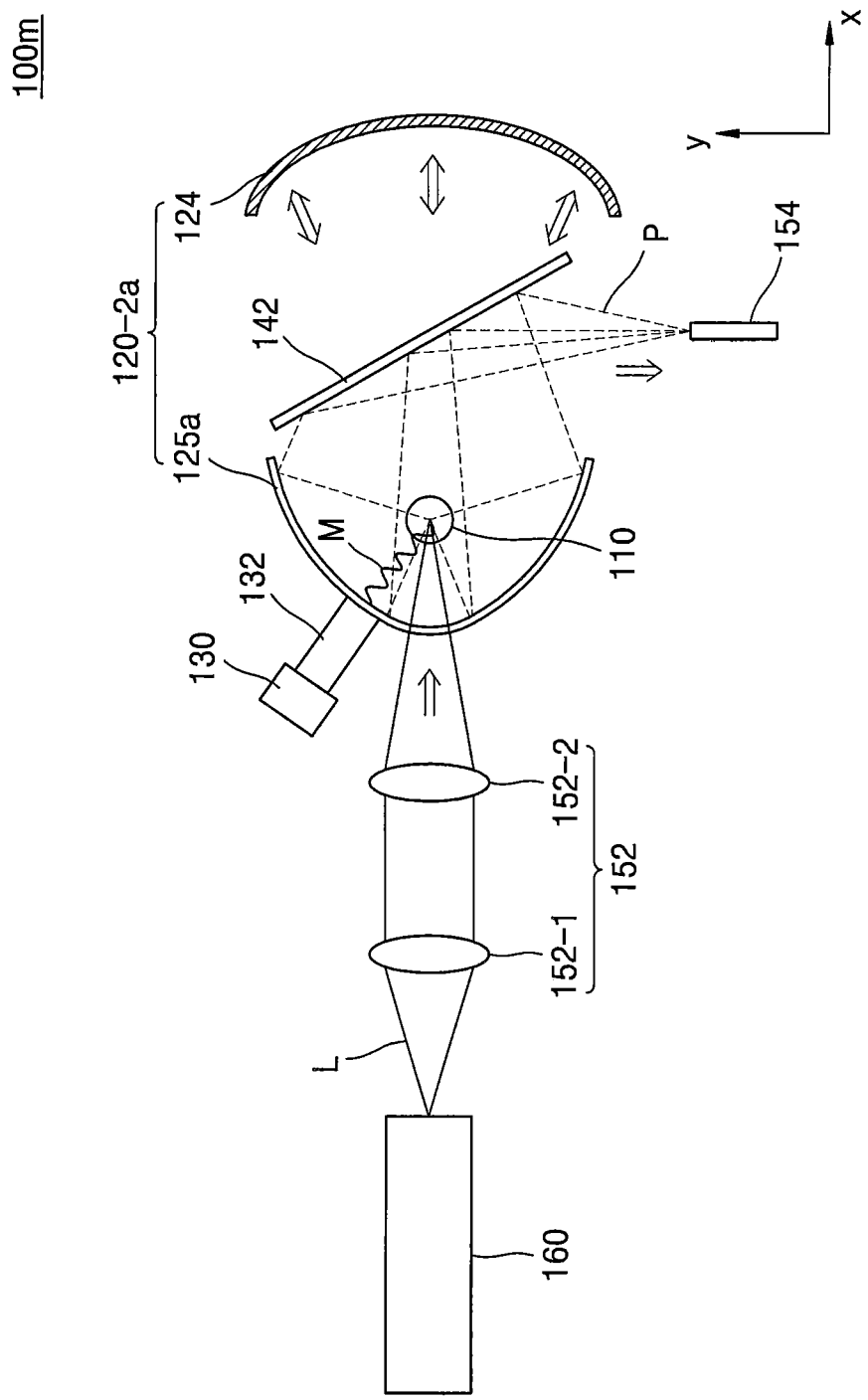

Referring to FIG. 16, a plasma light source 100*m* according to the present embodiment is similar to the plasma light source 100*l* of FIG. 15, but may differ from the plasma light source 100*l* of FIG. 15 in terms of a configuration of a curved mirror 125*a* of a double hybrid mirror 120-2*a*. As illustrated in FIG. 16, the curved mirror 125*a* may include only a mirror body 125*m* and an optical coating 125in. In addition, a pin-hole aperture PH may not be formed in the curved mirror 125*a*.

As illustrated in FIG. 15, a second hybrid curved mirror 124 may include a second mirror body 124*m*, a second metal coating 124out, and a second optical coating 124in. The second metal coating 124out may reflect a microwave M, and the second optical coating 124in may reflect a laser L and plasma light P.

In the configuration of the plasma light source 100*m*, the laser L and the microwave M may pass through the curved mirror 125*a* and be then input to a chamber 110. In some embodiments, the laser L and the microwave M, which pass through the chamber 110, may be reflected by the second hybrid curved mirror 124 and be then input to the chamber 110. The plasma light P, which is output from the chamber 110, may be output to a lens system 154 by the reflection of a dichroic mirror 142 or the reflection of the optical coating 125in and the dichroic mirror 142. In addition, the plasma light P may be reflected by the second hybrid curved mirror 124 and be output again by the reflection of the optical coating 125in and the dichroic mirror 142.

Figure 17:
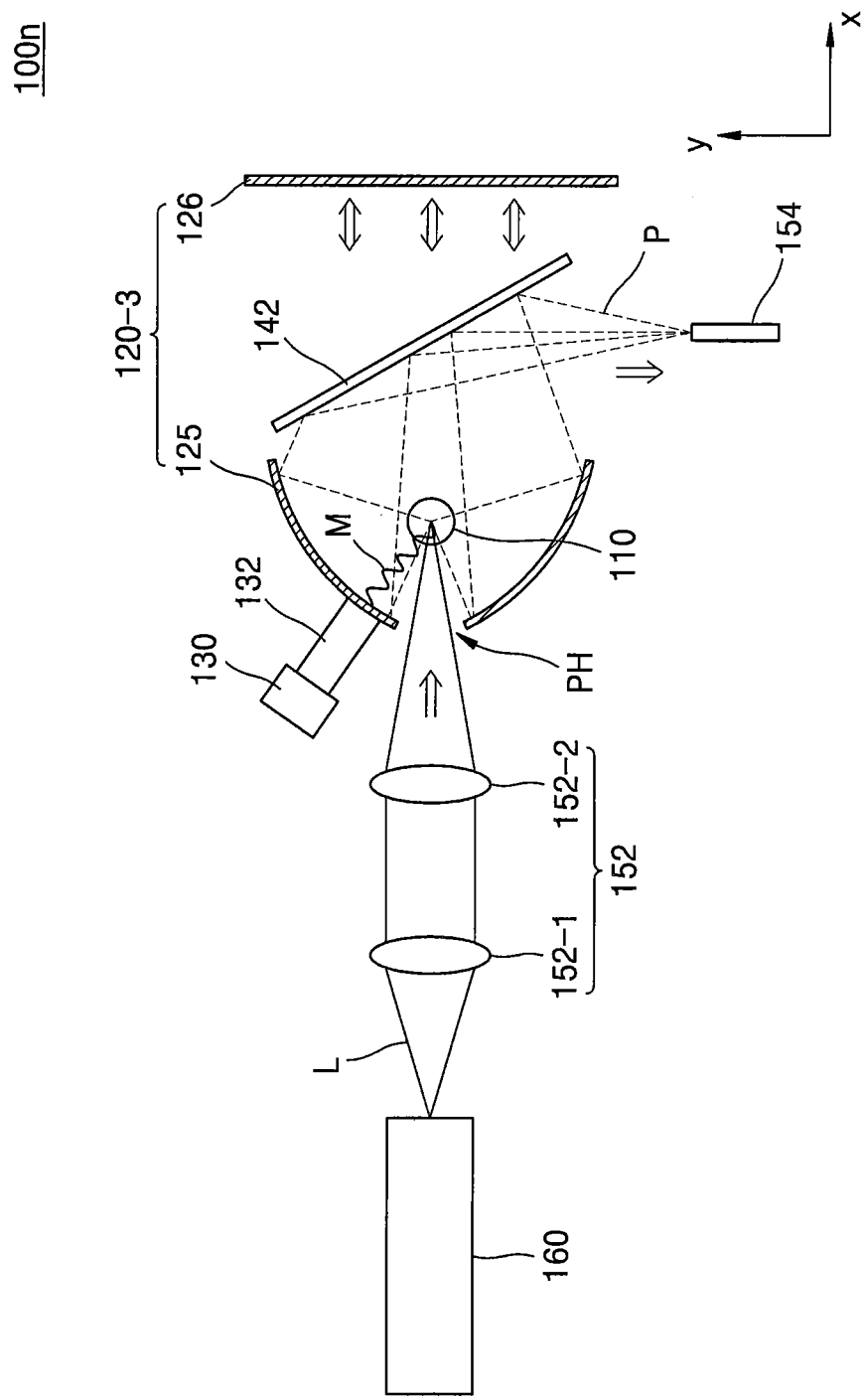

Referring to FIG. 17, a plasma light source 100*n* according to the present embodiment may be substantially the same as the plasma light source 100*l* of FIG. 15, except that a double hybrid mirror 120-3 includes a hybrid planar mirror 126 instead of the second hybrid curved mirror. That is, the double hybrid mirror 120-3 may include a first hybrid curved mirror 125 and the hybrid planar mirror 126. A dichroic mirror 142 may be disposed between the first hybrid curved mirror 125 and the hybrid planar mirror 126. A pin-hole aperture PH may be formed in the first hybrid curved mirror 125. The characteristics of the hybrid planar mirror 126 are substantially the same as those described above for the plasma light source 100g of FIG. 10.

In other words, the plasma light source 100n according to the present embodiment may be a combination of the plasma light source 100g of FIG. 10 and the plasma light source 100j of FIG. 13. The plasma light source 100n according to the present embodiment may be a combination of the plasma light source 100k of FIG. 14 and the plasma light source 100g of FIG. 10. In this case, the curved mirror 125 may include only the mirror body 125m and the optical coating 125in, and no pin-hole aperture may be formed in the curved mirror.

Figure 18:
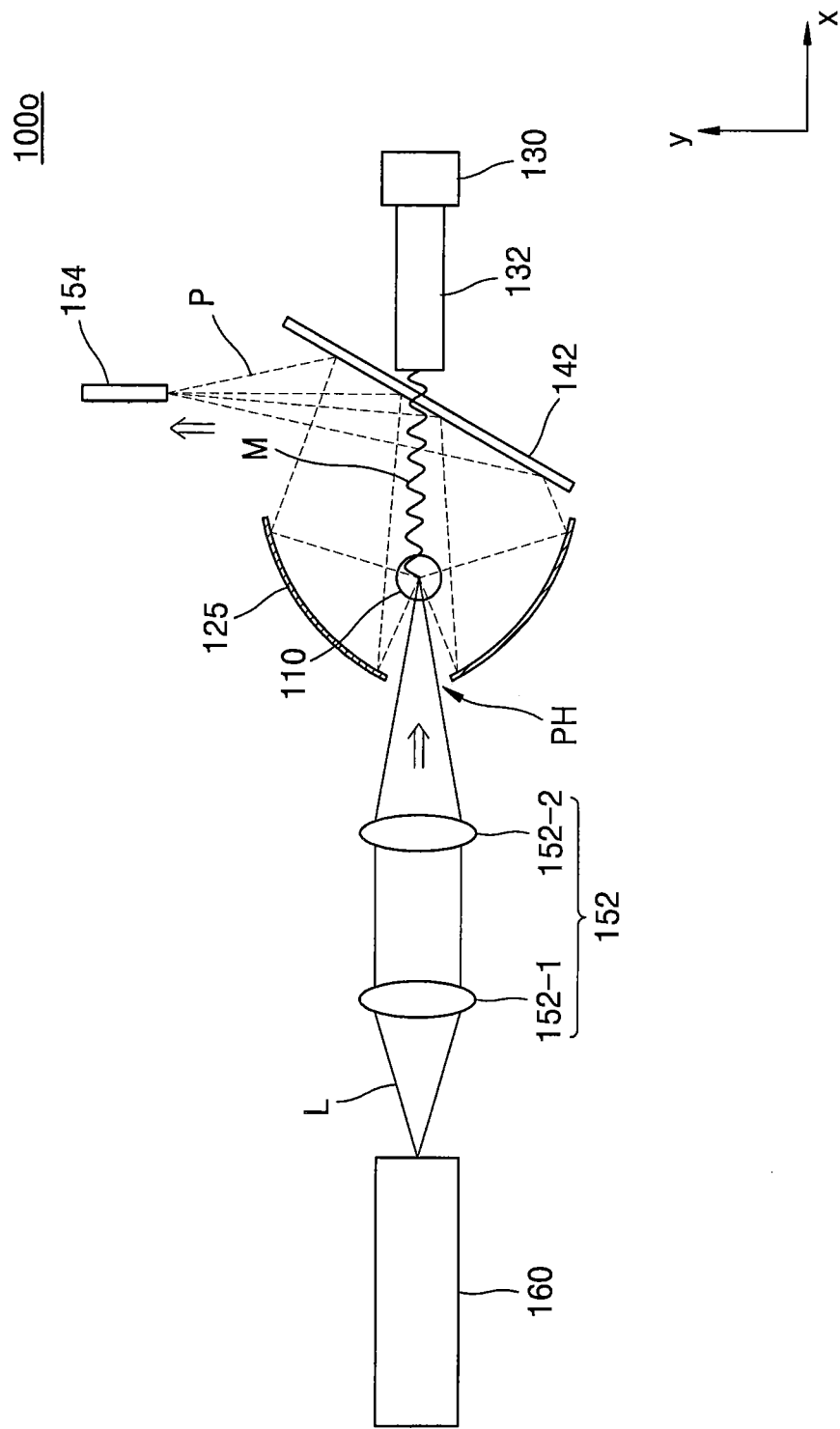

Referring to FIG. 18, in contrast to the plasma light source 100j of FIG. 13, a plasma light source 100o according to the present embodiment may include a dichroic mirror 142 disposed in a first direction (x direction), that is, a direction of an opening of a curved mirror 125. In addition, a microwave generator 130 and a waveguide 132 may be disposed in front of the dichroic mirror 142 in the first direction.

As described above with reference to FIG. 13, the curved mirror 125 may include a mirror body 125m, a metal coating 125out, and an optical coating 125in. A pin-hole aperture PH may be formed to extend completely through the curved mirror 125. The pin-hole aperture PH may be formed in the entire curved mirror 125 or may be formed in only the metal coating 125out. The dichroic mirror 142 may be transparent to a microwave M and reflect plasma light P. In some embodiments, as in the case of the plasma light source 100k of FIG. 14, the curved mirror 125 may include only the mirror body 125m and the optical coating 125in. In this case, no pin-hole aperture may be formed in the curved mirror 125.

In the configuration of the plasma light source 100o, a laser L may be input to a chamber 110 through the pin-hole aperture PH and the microwave M may pass through the dichroic mirror 142 and be input to the chamber 110. In some embodiments, the microwave M, which passes through the chamber 110, may be reflected by the metal coating 125out and be then input to the chamber 110 again. The plasma light P, which is output from the chamber 110, may be output to a lens system 154 by the reflection of the dichroic mirror 142 or the reflection of the optical coating 125in and the dichroic mirror 142.

The lens system 154 is disposed in an upper portion in a second direction (y direction), but the position of the lens system 154 is not limited thereto. For example, by adjusting the arrangement angle of the dichroic mirror 142, the lens system 154 may be disposed in a lower portion in the second direction, or may be disposed under or above the plane of the paper.

Figure 19:
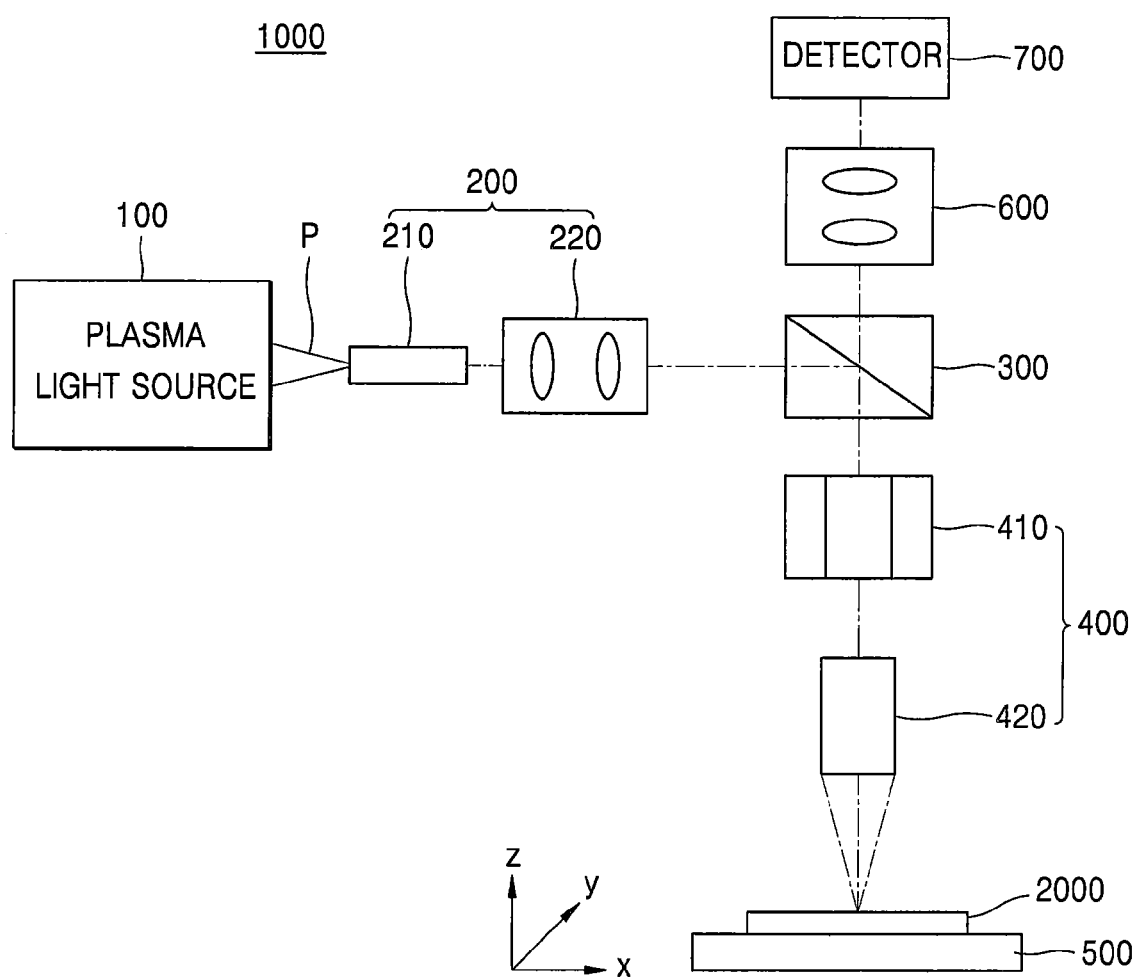
FIG. 19 is a schematic configuration diagram of an inspection apparatus including a plasma light source, according to some embodiments of the inventive concepts.

FIG. 19 is a schematic configuration diagram of a semiconductor inspection apparatus 1000 including a plasma light source 100, according to some embodiments of the inventive concepts.

Referring to FIG. 19, the inspection apparatus 1000 according to the present embodiment may include the plasma light source 100, a first optical system 200, a beam splitter 300, a second optical system 400, an inspection stage 500, a third optical system 600, and a detector 700.

The plasma light source 100 may be the plasma light source 100 described above with reference to FIG. 1 or 2. However, the inspection apparatus 1000 according to the present embodiment may adopt various plasma light sources 100a, 100b, . . . , 100n, and 100o of FIGS. 4, 5, 6B, 6C, and 8 to 18, as well as the plasma light source 100 of FIG. 1 or 2. In other words, the apparatus 1000 may employ any of the plasma light sources described herein.

The first optical system 200 may be disposed between the plasma light source 100 and the beam splitter 300. The first optical system 200 may focus plasma light P from the plasma light source 100 and transfer the plasma light P to the beam splitter 300. The first optical system 200 may include a rod lens 210 and a relay lens 220. The first optical system 200 is not limited to the above example and may include a plurality of various lenses to transfer the plasma light P to the beam splitter 300.

The beam splitter 300 may transfer the plasma light P to the second optical system 400 by reflecting the plasma light P transferred from the first optical system 200 and may transfer light to the detector 700 by transmitting the light reflected from an inspection object 2000 through the second optical system 400. The beam splitter 300 may be a type of dichroic mirror.

The second optical system 400 may irradiate the plasma light P reflected by the beam splitter on the inspection object 2000. The second optical system 400 may include a tube lens 410 and an object lens 420. The tube lens 410 may convert the light from the beam splitter 300 into parallel light, and the object lens 420 may focus the parallel light from the tube lens 410 and irradiate the focused parallel light to the inspection object 2000.

The inspection stage 500 is a device on which the inspection object 2000 is placed, and is movable in the x direction, y direction, and/or z direction. Thus, the inspection stage 500 may also be referred to as an XYZ stage. The inspection object 2000 may be various devices to be inspected, such as a wafer, a semiconductor package, a semiconductor chip, and a display panel.

The plasma light P may be irradiated on the inspection object 2000 and be then reflected. The reflected light may be transferred to the beam splitter 300 through the second optical system 400. The beam splitter 300 may transmit the reflected light and transfer the reflected light to the third optical system 600. The third optical system 600 may transfer the reflected light received from the beam splitter 300 to the detector 700. The third optical system 600 may be a relay lens.

The detector 700 may receive the reflected light from the third optical system 600 and transfer the reflected light to other analysis devices for analyzing the reflected light. In some cases, the detector 700 may include an analyzer for analyzing the reflected light or may interwork with an analyzer to analyze the reflected light. The detector 700 may be a charge-coupled device (CCD) camera. The detector 700 is not limited to the CCD camera and may adopt various sensors, including a complementary metal-oxide semiconductor (CMOS) image sensor.

The inspection apparatus 1000 illustrated in FIG. 19 includes the plasma light source 100, as described above. However, the plasma light source 100 may also be used in semiconductor processes, for example, an exposure process. Therefore, the plasma light source 100 may be included in an exposure apparatus.

Figure 20:
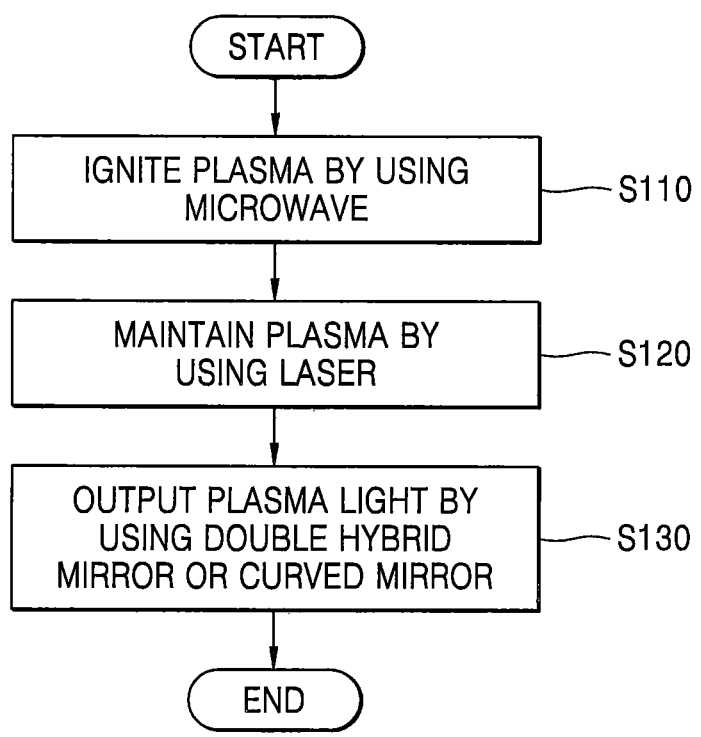
FIG. 20 is a flowchart of a method of generating plasma light, according to some embodiments of the inventive concepts.

FIG. 20 is a flowchart of a method of generating plasma light, according to some embodiments of the inventive concepts. For ease of understanding, the method of generating the plasma light will be described below with reference to FIGS. 1 to 18.

Referring to FIG. 20, in operation S110, the plasma is ignited by inputting the microwave to the chamber 110. The chamber 110 may airtightly accommodate a medium material for plasma ignition. The chamber 110 may be made of a material that is transparent to the microwave and may be maintained at a relatively low pressure. As described above, the plasma may be ignited by inputting the microwave to the chamber 110. The microwave may be input to the chamber 12 through the first hybrid curved mirror 122 as described above with reference to FIGS. 1 and 2, or may be input to the chamber 110 through the dichroic mirror 142 facing an opening or otherwise in front of the curved mirror 125 as described above with reference to FIG. 18.

In operation S120, the plasma is maintained by inputting the laser L to the chamber 110 at the same time as the plasma ignition or after the plasma ignition. Operation S120 may include increasing or maximizing the intensity of the plasma by increasing the power of the laser L, in some embodiments, up to an uppermost limit. The laser L may be input by using the dichroic mirror or may be input through the pin-hole aperture. The input of the laser L will be described below in more detail with reference to FIGS. 21 to 25.

In operation S130, the plasma light P generated by the plasma is output to the outside by using the double hybrid mirror or the curved mirror. The outputting of the plasma light P may adopt various methods or may be otherwise varied according to the configuration of the plasma light source. For example, the outputting of the plasma light P involve using the curved mirror, using the double hybrid mirror and/or the dichroic mirror, and an outputting method using the curved mirror and the dichroic mirror. Operation S120 of maintaining the plasma by the laser L and operation S130 of outputting the plasma light P are shown in separate blocks only for ease of understanding. Operations S120 and S130 may be performed simultaneously or sequentially. The outputting of the plasma light P will be described below in more detail with reference to FIGS. 21 to 25.

Since the method of generating the plasma light P, according to the present embodiment, uses the microwave M to ignite the plasma and uses the laser L to maintain the plasma and increase the intensity of the plasma, it is possible to address or solve the problems occurring in the method of increasing the power of the laser L and the method of adjusting the pressure of the chamber 110 and to increase or maximize the power of the plasma light P. In addition, the method of generating the plasma light P according to the present embodiment may increase the efficiency of input of the microwave M and/or the laser L to the chamber 110 by adopting the double hybrid mirror, thereby further increasing the output of the plasma light P. Furthermore, by appropriately arranging the dichroic mirrors, it is possible to increase the output of the plasma light P and to increase the degree of freedom for the position of the laser generator and/or the output direction of the plasma light P.

FIGS. 21 to 25 are flowcharts of operations of maintaining the plasma and outputting the plasma light P. For ease of understanding, the operations of maintaining the plasma and outputting the plasma light P will be described below with reference to FIGS. 1 to 18.

Figure 21:
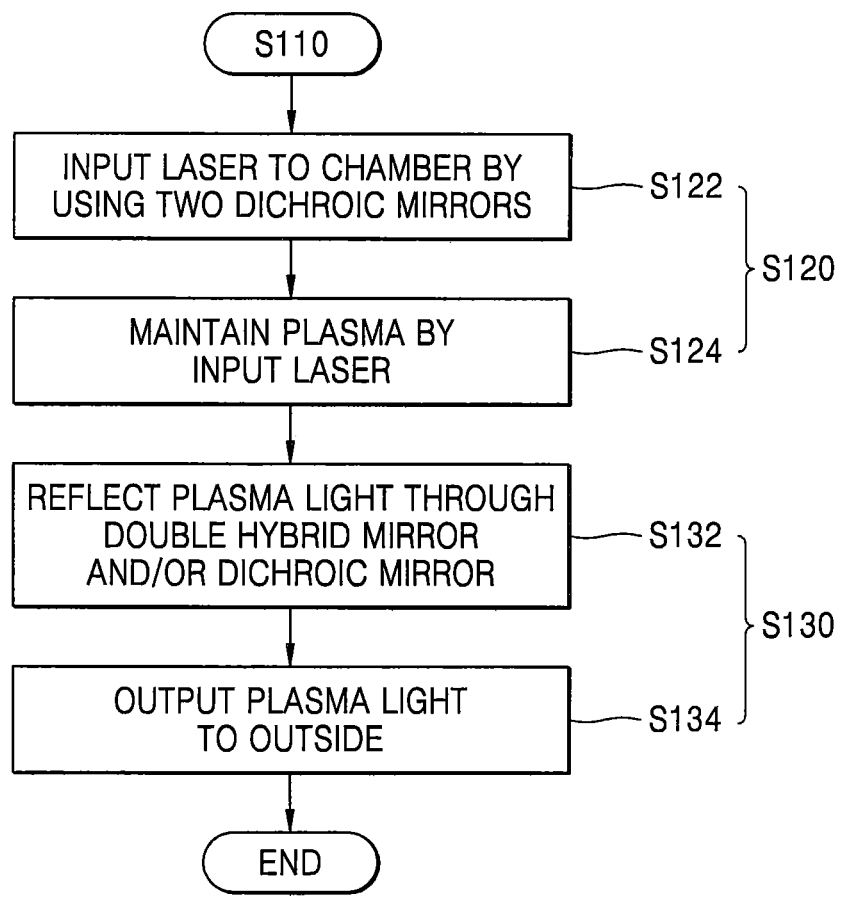
FIGS. 21 to 25 are flowcharts of an operation of maintaining plasma and an operation of outputting plasma light in the method of generating plasma light in FIG. 20.

Referring to FIG. 21, in a case where the plasma light source has the configuration of the plasma light source 100 of FIGS. 1 and 2 or the plasma light source 100g of FIG. 10, after operation S110 of igniting the plasma, operation S120 of maintaining the plasma and operation S130 of outputting the plasma light P may be subdivided as follows: For example, in operation S122 of operation S120, the laser L may be input to the chamber 110 by using two dichroic mirrors, for example, the first and second dichroic mirrors 142 and 144. The inputting of the laser L to the chamber 110 by using the two dichroic mirrors, for example, the first and second dichroic mirrors 142 and 144, may include the reflection of the laser L by the first optical coating 122in. The laser L may be input to the chamber 110 or travel toward the first optical coating 122in by the reflection of the second dichroic mirror 144 and the first dichroic mirror 142. The laser L, which travels toward the first optical coating 122in, may be reflected by the first optical coating 122in and be input to the chamber 110.

In operation S124, the laser L, which is input to the chamber 110, may maintain the plasma and increase the intensity of the plasma within the chamber 110. The operation of inputting the laser L and the operation of maintaining the plasma and increasing the intensity of the plasma by inputting the laser L to the chamber 110 are shown in separate blocks only for ease of understanding. These operations may be performed simultaneously or sequentially.

In operation S132 of operation S130, the plasma light P, which is generated by the plasma within the chamber 110, may be reflected by the double hybrid mirror and/or the dichroic mirror. Specifically, the plasma light P may directly travel toward the first dichroic mirror 142, and/or may travel toward the first dichroic mirror 142 by the reflection of the first optical coating 122in. The plasma light P, which travels toward the first dichroic mirror 142, may travel toward the second dichroic mirror 144 by the reflection of the first dichroic mirror 142. In some embodiments, the reflection of the plasma light P may include the reflection from the second optical coating 124in.

In operation S134, the plasma light P, which is reflected by the first dichroic mirror 142, may be output through the second dichroic mirror 144. As described above, operation S120 of maintaining the plasma by the laser L and operation S130 of outputting the plasma light P are shown in separate blocks only for ease of understanding. Operations S120 and S130 may be performed simultaneously or sequentially.

Figure 22:
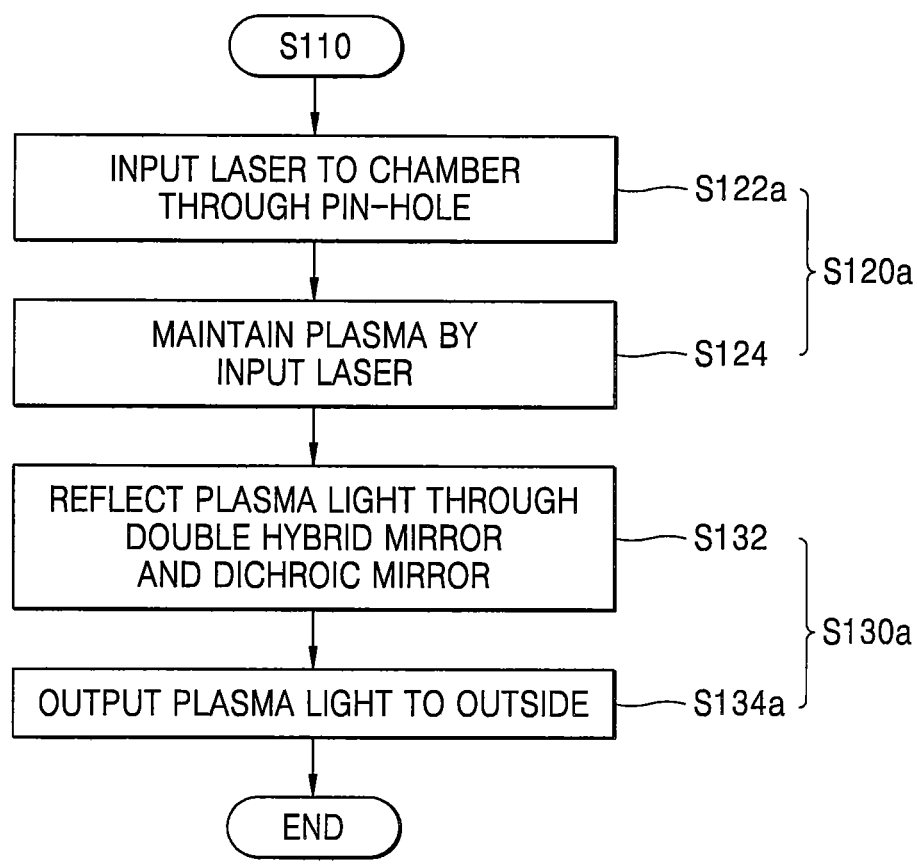

Referring to FIG. 22, in a case where the plasma light source has the configuration of the plasma light source 100e or 100h of FIG. 8 or 11, after operation S110 of igniting the plasma, operation S120a of maintaining the plasma and operation S130a of outputting the plasma light P may be subdivided as follows: For example, in operation S122a of operation S120a, the laser L may be input to the chamber 110 through the pin-hole aperture PH of the second hybrid curved mirror 124a or the hybrid planar mirror 126a. The inputting of the laser L to the chamber 110 through the pin-hole aperture PH may include the transmission of the first dichroic mirror 142 and the reflection of the first optical coating 122in. The laser L, which passes through the first dichroic mirror 142, may be directly input to the chamber 110 and/or may be reflected from the first optical coating 122in and be input to the chamber 110.

In operation S124, the laser L, which is input to the chamber 110, may maintain the plasma and increase the intensity of the plasma within the chamber 110. In the present embodiment, the operation of inputting the laser L and the operation of maintaining the plasma and increasing the intensity of the plasma by inputting the laser L are shown in separate blocks only for ease of understanding. These operations may be performed simultaneously or sequentially.

In operation S132 of operation S130a, the plasma light P, which is generated by the plasma within the chamber 110, may be reflected by the double hybrid mirror and/or the dichroic mirror. Specifically, the plasma light P may directly travel toward the first dichroic mirror 142, and/or may travel toward the first dichroic mirror 142 by the reflection of the first optical coating 122in. The plasma light P, which travels toward the first dichroic mirror 142, may be reflected by the first dichroic mirror 142. In some embodiments, the reflection of the plasma light P may include the reflection from the second optical coating 124in.

In operation S134a, the plasma light P, which is reflected by the first dichroic mirror 142, may be output to the lens system 154. In the present embodiment, since the second dichroic mirror is not present, the plasma light P may be directly output to the lens system 154, without passing through the second dichroic mirror.

Figure 23:
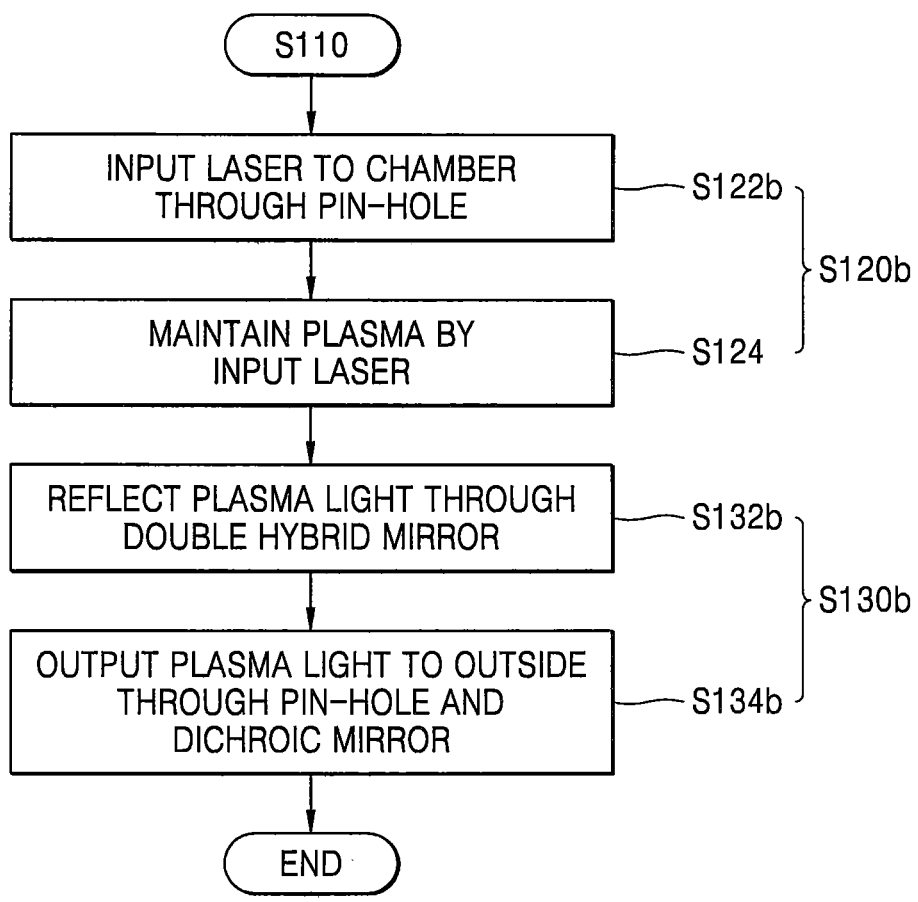

Referring to FIG. 23, in a case where the plasma light source has the configuration of the plasma light source 100f or 100i of FIG. 9 or 12, after operation S110 of igniting the plasma, operation S120b of maintaining the plasma and operation S130b of outputting the plasma light P may be subdivided as follows: For example, in operation S122b of operation S120b, the laser L may be input to the chamber 110 through the pin-hole aperture PH of the second hybrid curved mirror 124a or the hybrid planar mirror 126a. The inputting of the laser L to the chamber 110 through the pin-hole aperture PH may include the transmission or reflection of the third dichroic mirror 146 and the reflection of the first optical coating 122in. That is, the laser L, which passes through the third dichroic mirror 146 or is reflected by the third dichroic mirror 146, may penetrate the second hybrid curved mirror 124a or the hybrid planar mirror 126a through the pin-hole aperture PH and be input to the chamber 110, and/or be input to the chamber 110 by the reflection of the first optical coating 122in.

In operation S124, the laser L, which is input to the chamber 110, may maintain the plasma and increase the intensity of the plasma within the chamber 110. In the present embodiment, the operation of inputting the laser L and the operation of maintaining the plasma and increasing the intensity of the plasma by the input of the laser L are shown in separate blocks only for ease of understanding. These operations may be performed simultaneously or sequentially.

In operation S132b of operation S130b, the plasma light P, which is generated from the plasma within the chamber 110, may be reflected by the double hybrid mirror. Specifically, the plasma light P may directly travel toward the pin-hole aperture PH of the second hybrid curved mirror 124a or the hybrid planar mirror 126a, and/or may travel toward the pin-hole aperture PH through the reflection of the first optical coating 122in. In some embodiments, the reflection of the plasma light P may include the reflection from the second optical coating 124in.

In operation S134b, the plasma light P may be output to the lens system 154 through the pin-hole aperture PH and the third dichroic mirror 146. That is, the plasma light P, which travels toward the pin-hole aperture PH, may penetrate the second hybrid curved mirror 124a or the hybrid planar mirror 126a through the pin-hole aperture PH and be then input to the third dichroic mirror 146. In operation S134b, the plasma light P, which is input to the third dichroic mirror 146, may be output to the lens system 154 through the reflection or transmission of the third dichroic mirror 146.

Figure 24:
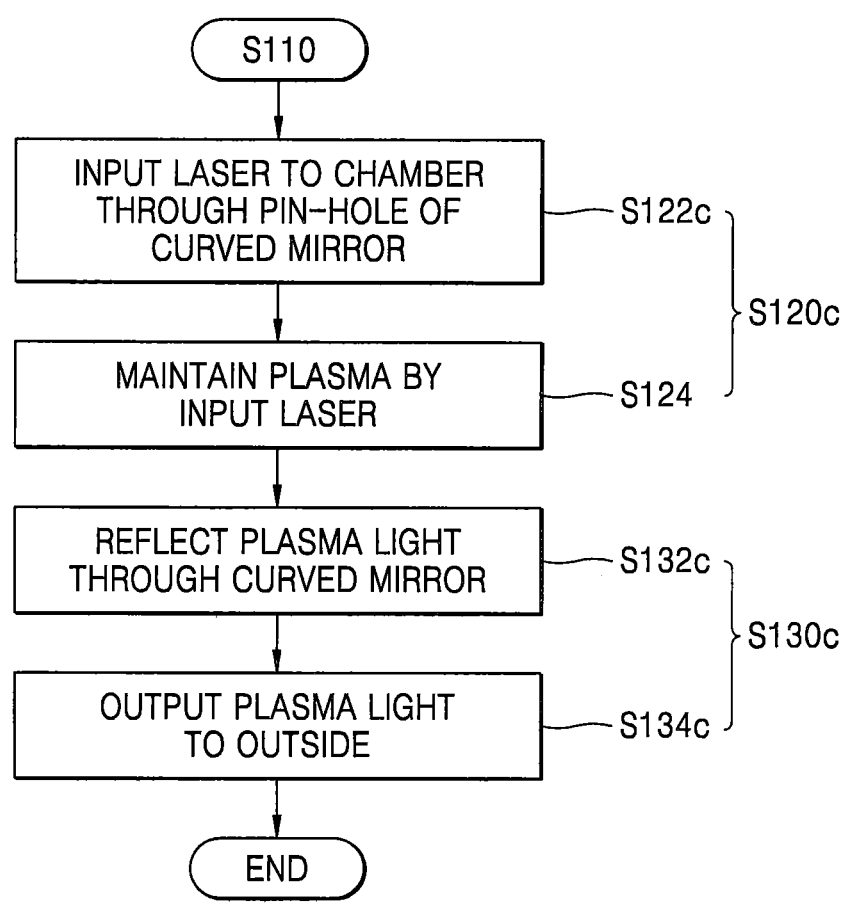

Referring to FIG. 24, in a case where the plasma light source has the configuration of the plasma light source 100j of FIG. 13, after operation S110 of igniting the plasma, operation S120c of maintaining the plasma and operation S130c of outputting the plasma light may be subdivided as follows: For example, in operation S122c of operation S120c, the laser L may be input to the chamber 110 through the pin-hole aperture PH of the curved mirror 125. In a case where the curved mirror 125a does not include the metal coating as illustrated in FIG. 14, the pin-hole aperture PH may not be formed in the curved mirror 125a, and the laser L may be input to the chamber 110 through the curved mirror 125a. In addition, in a case where the plasma light source has the configuration of the double hybrid mirror 120-2, 120-2a, or 120-3 of FIG. 15, 16, or 17, the inputting of the laser L to the chamber 110 may include the inputting by the reflection of the second hybrid curved mirror 124 or the hybrid planar mirror 126.

In operation S124, the laser L, which is input to the chamber 110, may maintain the plasma and increase the intensity of the plasma within the chamber 110. In the present embodiment, the operation of inputting the laser L and the operation of maintaining the plasma and increasing the intensity of the plasma by inputting the laser L to the chamber 110 are shown in separate blocks only for ease of understanding. These operations may be performed simultaneously or sequentially.

In operation S132c of operation S130c, the plasma light P, which is generated by the plasma within the chamber 110, may be reflected by the curved mirror 125. In operation S134c, the plasma light P, which is reflected by the curved mirror 125, may be output to the lens system 154. In some embodiments, the outputting of the plasma light P to the lens system 154 may include the direct outputting of the plasma light P from the chamber 110 to the lens system 154, without being reflected by the curved mirror 125.

In a case where the plasma light source has the configuration of the double hybrid mirror 120-2, 120-2a, or 120-3 of FIG. 15, 16, or 17 and includes the dichroic mirror 142, operation S132c of reflecting the plasma light P through the curved mirror 125 may include the reflection from the dichroic mirror 142. That is, the plasma light P may travel toward the dichroic mirror 142 directly or by the reflection from the curved mirror 125 and be then reflected by the first dichroic mirror 142. In the presence of the dichroic mirror 142, the outputting of the plasma light P to the lens system 154 may be performed by the reflection of the dichroic mirror 142. That is, the plasma light P may be reflected by the dichroic mirror 142 and be output to the lens system 154.

Figure 25:
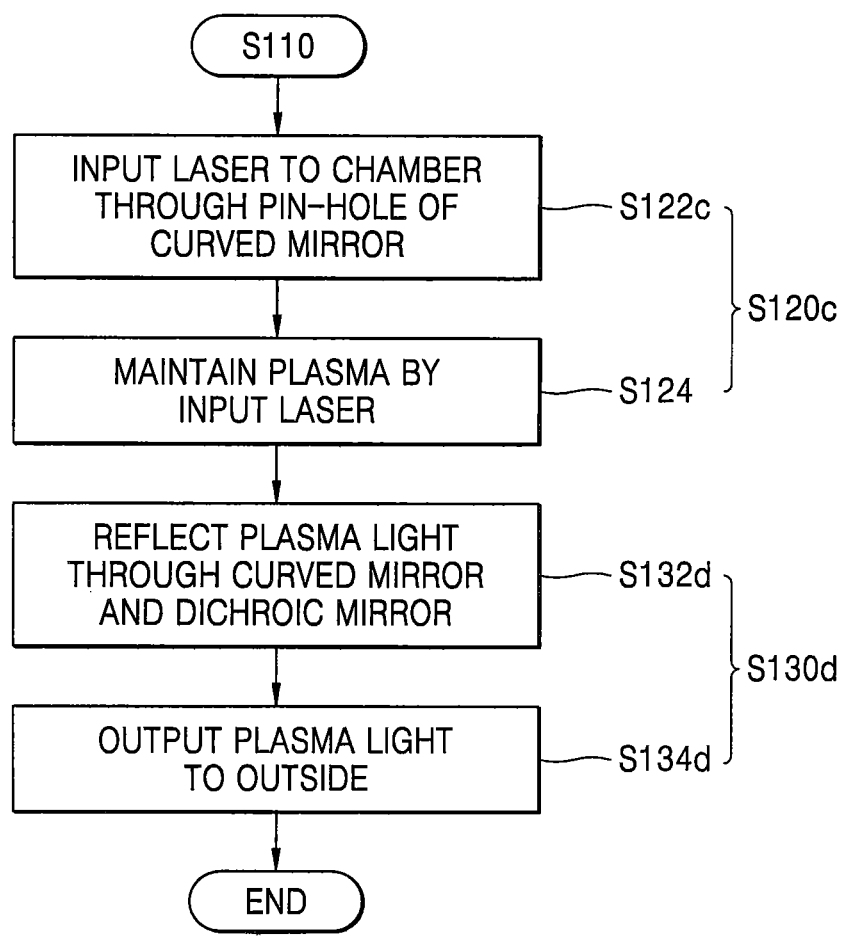

Referring to FIG. 25, in a case where the plasma light source has the configuration of the plasma light source 100o of FIG. 18, in operation S110 of igniting the plasma, the microwave M may be input to the chamber 110 through the dichroic mirror 142, which is disposed in the opened front of the curved mirror 125. After operation S110, operation S120c of maintaining the plasma and operation S130d of outputting the plasma light may be subdivided as follows: For example, in operation S122c of operation S120c, the laser L may be input to the chamber 110 through the pin-hole aperture PH of the curved mirror 125. In a case where the curved mirror 125a does not include the metal coating as illustrated in FIG. 14, the pin-hole aperture PH may not be formed in the curved mirror 125a, and the laser L may be input to the chamber 110 through the curved mirror 125a.

In operation S124, the laser L, which is input to the chamber 110, may maintain the plasma and increase the intensity of the plasma within the chamber 110. In the present embodiment, the operation of inputting the laser L and the operation of maintaining the plasma and increasing the intensity of the plasma by inputting the laser L are shown in separate blocks only for ease of understanding. These operations may be performed simultaneously or sequentially.

In operation S132d of operation S130d, the plasma light P, which is generated by the plasma within the chamber 110, may be reflected by the curved mirror 125 and the dichroic mirror 142. Specifically, the plasma light P may directly travel toward the dichroic mirror 142, or may travel toward the dichroic mirror 142 by the reflection of the first optical coating 122in.

In operation S134d, the plasma light P, which travels toward the dichroic mirror 142, may be reflected by the dichroic mirror 142 and be then output to the lens system 154.

While the inventive concepts have been particularly shown and described with reference to exemplary embodiments thereof, it will be understood that various changes in form and details may be made therein without departing from the spirit and scope of the following claims.

That which is claimed:

1. A plasma light source comprising:
   a chamber comprising an ionizable medium therein;
   an ignition source configured to provide first electromagnetic radiation to the chamber;
   a sustaining source configured to separately provide second electromagnetic radiation to the chamber;
   a first curved mirror positioned adjacent the chamber; and
   a second curved mirror positioned opposite the first mirror and arranged to direct the first electromagnetic radiation toward the chamber.

2. The plasma light source of claim 1, wherein at least one of the first and second curved mirrors comprises a hybrid mirror including first and second layers having different refractive indices, at least one of the first and second layers being reflective with respect to the first electromagnetic radiation.

3. The plasma light source of claim 2, wherein the first and second layers comprise inner and outer surfaces, respectively, comprising different materials and/or different curvatures.

4. The plasma light source of claim 3, wherein the second layer is reflective to the first electromagnetic radiation, and wherein the first layer is reflective to light emitted from plasma ignited by the first electromagnetic radiation.

5. The plasma light source of claim 4, wherein a focus of the second layer of the second curved mirror is on the second layer of the first curved mirror.

6. The plasma light source of claim 4, wherein a focus of the first layer of the second curved mirror is not on the chamber.

7. The plasma light source of claim 4, wherein a focus of the second layer of the respective first and second curved mirrors is on the chamber.

8. The plasma light source of claim 1, further comprising:
   at least one dichroic mirror that is reflective with respect to the second electromagnetic radiation, wherein the at least one dichroic mirror is positioned between the first and second curved mirrors and arranged to direct the second electromagnetic radiation to the first curved mirror.

9. The plasma light source of claim 8, wherein the at least one dichroic mirror is transmissive with respect to the first electromagnetic radiation.

10. The plasma light source of claim 9, wherein the at least one dichroic mirror comprises a first dichroic mirror, and further comprising:
    a second dichroic mirror that is reflective with respect to the second electromagnetic radiation and is arranged to direct the second electromagnetic radiation to the first dichroic mirror.

11. The plasma light source of claim 1, wherein a distance between the first and second curved mirrors defines a resonator based on a wavelength of the first electromagnetic radiation.

12. The plasma light source of claim 1, wherein an outer surface of the first curved mirror is free of a metal coating.

13. The plasma light source of claim 1, wherein the ignition source comprises a microwave generator configured to provide microwave energy as the first electromagnetic radiation, and further comprising:
    a waveguide coupled to the microwave generator and configured to transmit the microwave energy from the microwave generator to the first curved mirror,
    wherein the first curved mirror is reflective with respect to the microwave energy.

14. The plasma light source of claim 13, wherein the waveguide is positioned at a non-zero angle relative to an axis of symmetry of the first curved mirror.

15. The plasma light source of claim 13, wherein the sustaining source comprises a laser generator configured to provide laser energy as the second electromagnetic radiation, and wherein the second curved mirror includes a pin-hole aperture therein that is arranged to provide the laser energy from the sustaining source therethrough to the chamber.

16. The plasma light source of claim 15, wherein a dimension of the pin-hole aperture is less than about one half of a wavelength of the microwave energy.

17. The plasma light source of claim 15, further comprising a dichroic mirror that is reflective or transmissive to the laser energy, wherein the dichroic mirror is positioned adjacent the pin-hole aperture and is arranged to direct the laser energy therethrough to the chamber.

18. The plasma light source of claim 17, wherein the dichroic mirror is further reflective or transmissive with respect to light emitted from plasma ignited by the microwave energy and is arranged to direct the light emitted from the plasma as an output of the plasma light source.

* * * * *